(12) United States Patent
Fukuda et al.

(10) Patent No.: US 11,467,024 B2
(45) Date of Patent: Oct. 11, 2022

(54) DIAGNOSTIC DEVICE, COMPUTER PROGRAM, AND DIAGNOSTIC SYSTEM

(71) Applicants: Hiroaki Fukuda, Kanagawa (JP); Yasunobu Shirata, Tokyo (JP); Yohsuke Muramoto, Kanagawa (JP); Junichi Takami, Kanagawa (JP)

(72) Inventors: Hiroaki Fukuda, Kanagawa (JP); Yasunobu Shirata, Tokyo (JP); Yohsuke Muramoto, Kanagawa (JP); Junichi Takami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 694 days.

(21) Appl. No.: 16/061,718

(22) PCT Filed: Dec. 22, 2016

(86) PCT No.: PCT/JP2016/088471
§ 371 (c)(1),
(2) Date: Jun. 13, 2018

(87) PCT Pub. No.: WO2017/111072
PCT Pub. Date: Jun. 29, 2017

(65) Prior Publication Data
US 2018/0356282 A1 Dec. 13, 2018

(30) Foreign Application Priority Data

Dec. 25, 2015 (JP) .............................. JP2015-254041
Nov. 7, 2016 (JP) .............................. JP2016-217144

(51) Int. Cl.
*G01H 3/00* (2006.01)
*G05B 19/4065* (2006.01)
(Continued)

(52) U.S. Cl.
CPC ............. *G01H 3/00* (2013.01); *G01H 17/00* (2013.01); *G03G 15/00* (2013.01); *G03G 15/55* (2013.01);
(Continued)

(58) Field of Classification Search
CPC .......... G01H 3/00; G06N 20/00; G06N 7/005; G03H 17/00; G03G 15/00; G03G 15/55;
(Continued)

(56) References Cited

U.S. PATENT DOCUMENTS 3,366,248 A * 1/1968 Sedgwick .......... B23Q 3/15546
483/9
4,918,427 A 4/1990 Thomas et al.
(Continued)

FOREIGN PATENT DOCUMENTS

CN 105171525 A 12/2015
EP 2477086 A1 7/2012
(Continued)

OTHER PUBLICATIONS

Chinese Office Action and English translation thereof dated Jul. 3, 2020.
(Continued)

*Primary Examiner* — Catherine T. Rastovski
*Assistant Examiner* — Kaleria Knox
(74) *Attorney, Agent, or Firm* — Harness, Dickey & Pierce, P.L.C.

(57) ABSTRACT

A diagnostic device includes a reception unit and a determination unit. The reception unit is configured to receive context information and sensing information. The context information corresponds to a certain operation of a target item that constitutes a target device. The context information is a piece of a plurality of pieces of context information each describing an operation of the target item determined
(Continued)

depending on a type of operation of the target device. The sensing information is on a physical quantity that varies in accordance with the operation of the target item. The determination unit is configured to determine a state of the target item based on the sensing information detected while the target item is performing the certain operation, and based on a model corresponding to the received context information. The model is a model of one or more models respectively defined for one or more pieces of the context information.

15 Claims, 14 Drawing Sheets

(51) Int. Cl.

| | | |
|---|---|---|
| *G03G 15/00* | (2006.01) | |
| *G07C 3/00* | (2006.01) | |
| *G06N 20/00* | (2019.01) | |
| *G01H 17/00* | (2006.01) | |
| *G06N 7/00* | (2006.01) | |

(52) U.S. Cl.
CPC ......... *G05B 19/4065* (2013.01); *G06N 20/00* (2019.01); *G07C 3/00* (2013.01); *G03G 2215/00637* (2013.01); *G05B 2219/37245* (2013.01); *G05B 2219/50276* (2013.01); *G06N 7/005* (2013.01)

(58) Field of Classification Search
CPC .......... G03G 2215/00637; G03G 2219/37245; G05B 19/4065; G05B 2219/50276; G05B 23/0259; G05B 19/4069; G07C 3/00; G01B 21/042; B23Q 1/70; B23Q 3/15546
See application file for complete search history.

(56) References Cited

U.S. PATENT DOCUMENTS

| | | |
|---|---|---|
| 6,795,778 B2 | 9/2004 | Dodge et al. |
| 2002/0198667 A1 | 12/2002 | Dodge et al. |
| 2012/0041575 A1* | 2/2012 | Maeda ................. G05B 23/024 |
| | | 700/80 |
| 2012/0166142 A1 | 6/2012 | Maeda et al. |
| 2014/0195184 A1 | 7/2014 | Maeda et al. |
| 2015/0220847 A1 | 8/2015 | Shibuya et al. |
| 2015/0242754 A1 | 8/2015 | Fukuda et al. |
| 2015/0293523 A1* | 10/2015 | Yamamoto ............. G06N 20/10 |
| | | 700/175 |
| 2015/0345937 A1* | 12/2015 | Seitz ................... G01B 21/042 |
| | | 250/231.13 |
| 2016/0098645 A1* | 4/2016 | Sharma ................... G06F 16/36 |
| | | 706/12 |
| 2016/0147187 A1 | 5/2016 | Muramoto et al. |
| 2016/0341631 A1* | 11/2016 | Kamiya .................. B23Q 1/70 |
| 2019/0079488 A1* | 3/2019 | Kanja ................ G05B 19/4069 |

FOREIGN PATENT DOCUMENTS

| | | | |
|---|---|---|---|
| EP | 2905665 A2 * | 8/2015 | ............. G06N 5/047 |
| GB | 2231662 B | 4/1993 | |
| JP | S62-213909 A | 9/1987 | |
| JP | H05-337790 A | 12/1993 | |
| JP | H11-129145 A | 5/1999 | |
| JP | 2000-317710 A | 11/2000 | |
| JP | 2002-014721 | 1/2002 | |
| JP | 2006-184722 | 7/2006 | |
| JP | 2008-213086 | 9/2008 | |
| JP | 2012-20359 A | 2/2012 | |
| JP | 2013-008092 | 1/2013 | |
| JP | 2015-161745 | 9/2015 | |
| JP | 2016-105267 | 6/2016 | |
| WO | WO-02/095323 A1 | 11/2002 | |
| WO | WO-2015/159577 A1 | 10/2015 | |

OTHER PUBLICATIONS

International Search Report dated Mar. 28, 2017 in PCT/JP2016/088471 filed on Dec. 22, 2016.
Yohsuke Muramoto, et al. Effectiveness of Contextual Information for Abnormal Sound Detection, Acoustical Society of Japan 2015 Spring Meeting, Mar. 18, 2015, p. 151-152, 1880-7658.
Notice of Rejection (Application No. 2016-217144) (dated Mar. 16, 2017).
Extended European Search Report dated Dec. 14, 2018.
European Official Communication dated Jul. 5, 2019.
Office Action for Japanese Patent Application No. 2017-110699 dated Nov. 4, 2020.
Office Action for Japanese Patent Application No. 2017-110699 dated Aug. 24, 2021.

* cited by examiner

[Fig. 1]
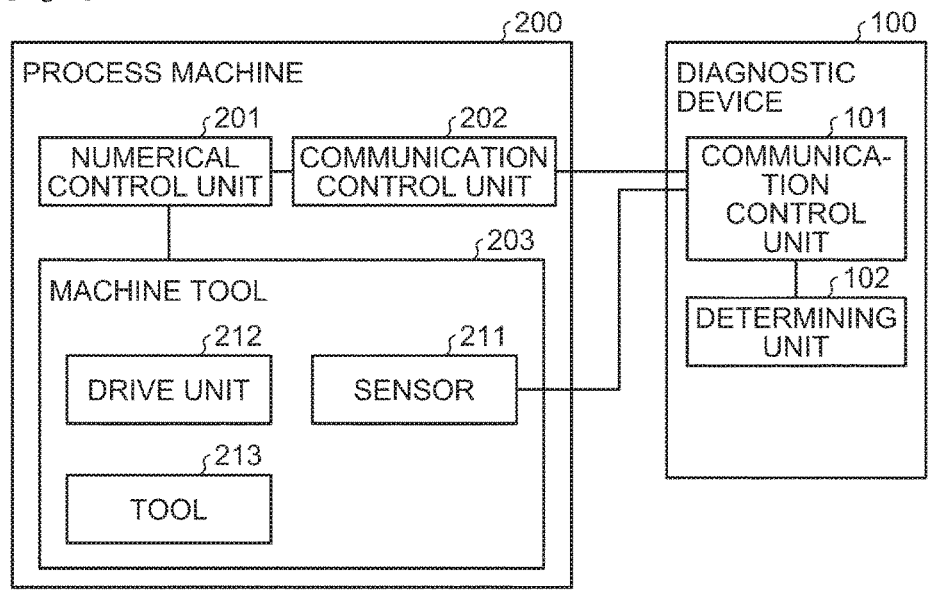
[Fig. 2]
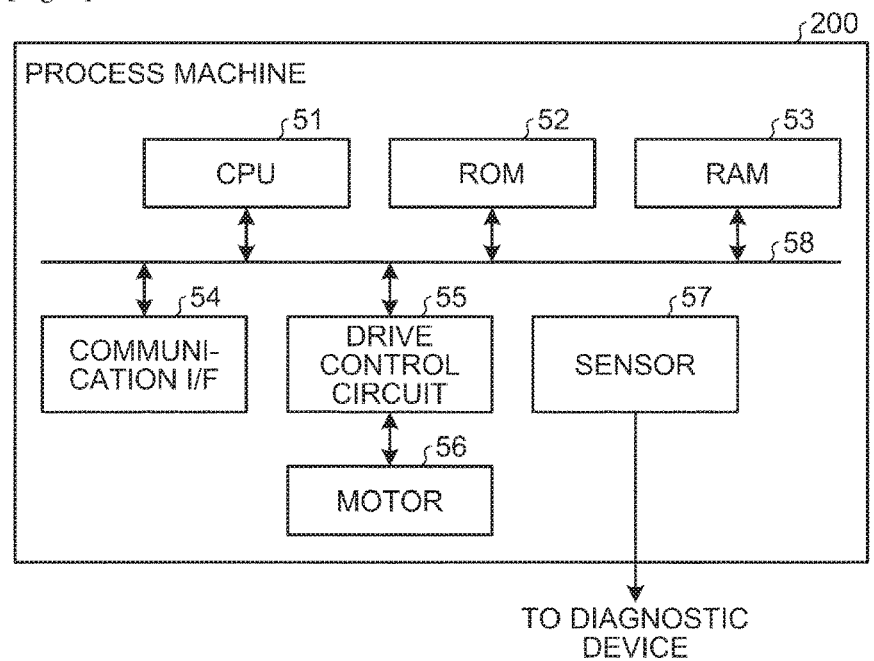
[Fig. 3]
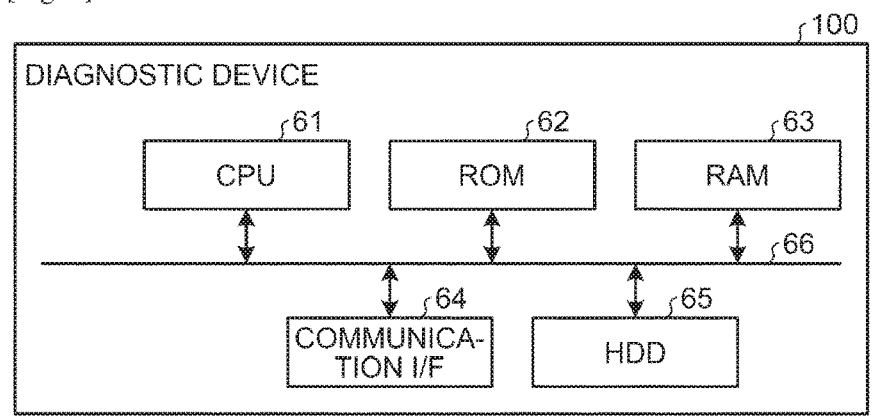

[Fig. 4]
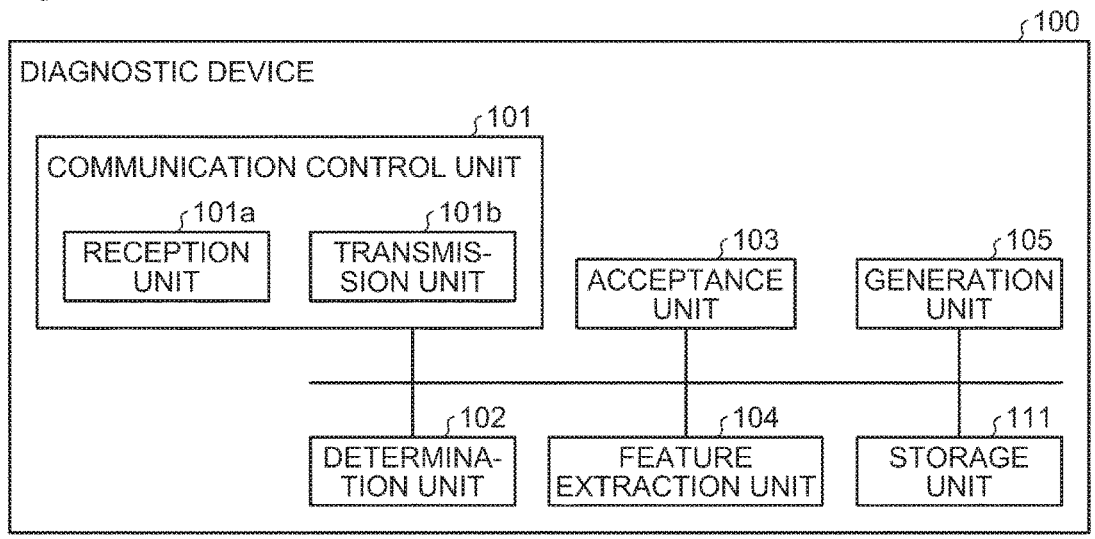
[Fig. 5]
| CONTEXT INFORMATION (DRILL DIAMETER) | LEARNED MODEL NAME |
|---|---|
| φ 1 mm | MODEL φ1 |
| φ 3 mm | MODEL φ3 |
| φ 5 mm | MODEL φ5 |
[Fig. 6]
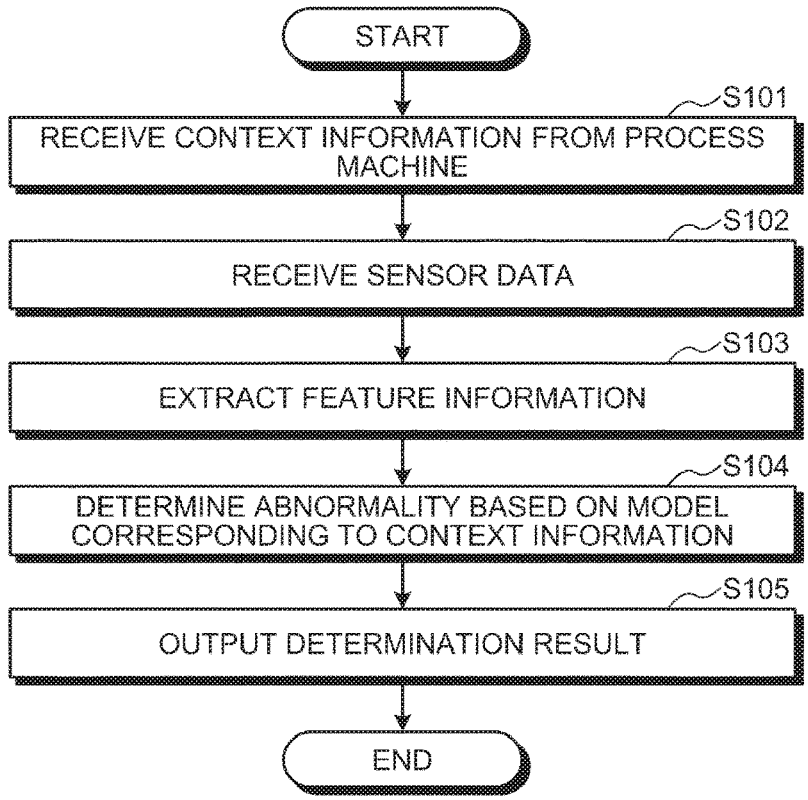

[Fig. 7]
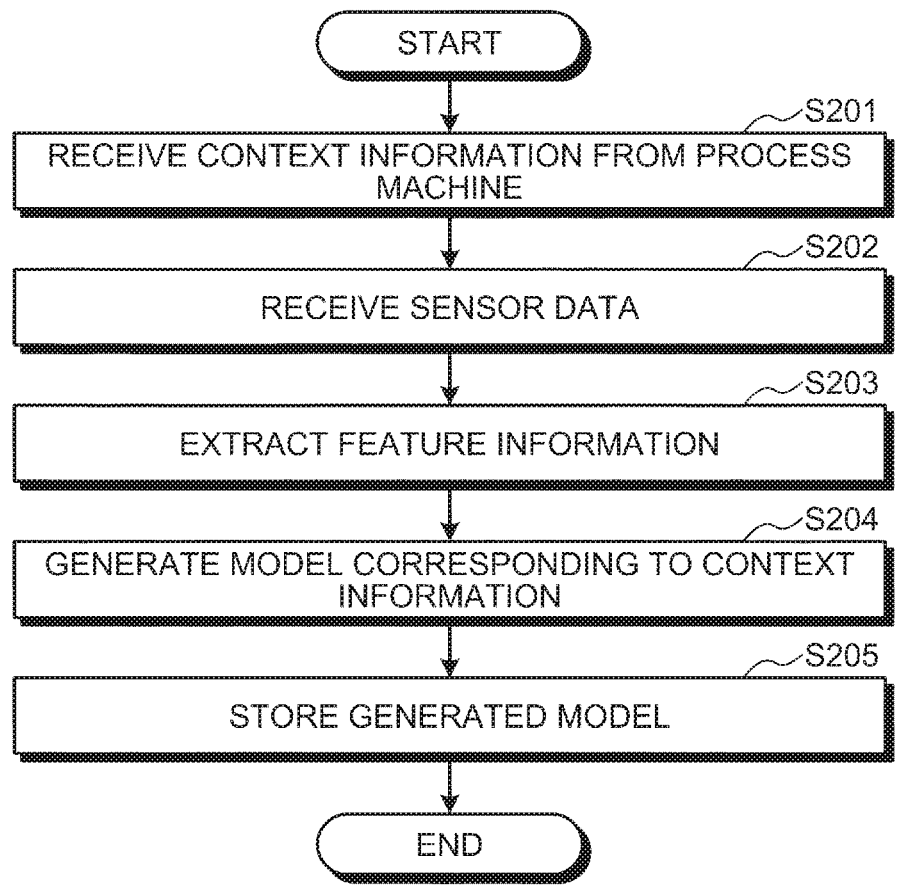

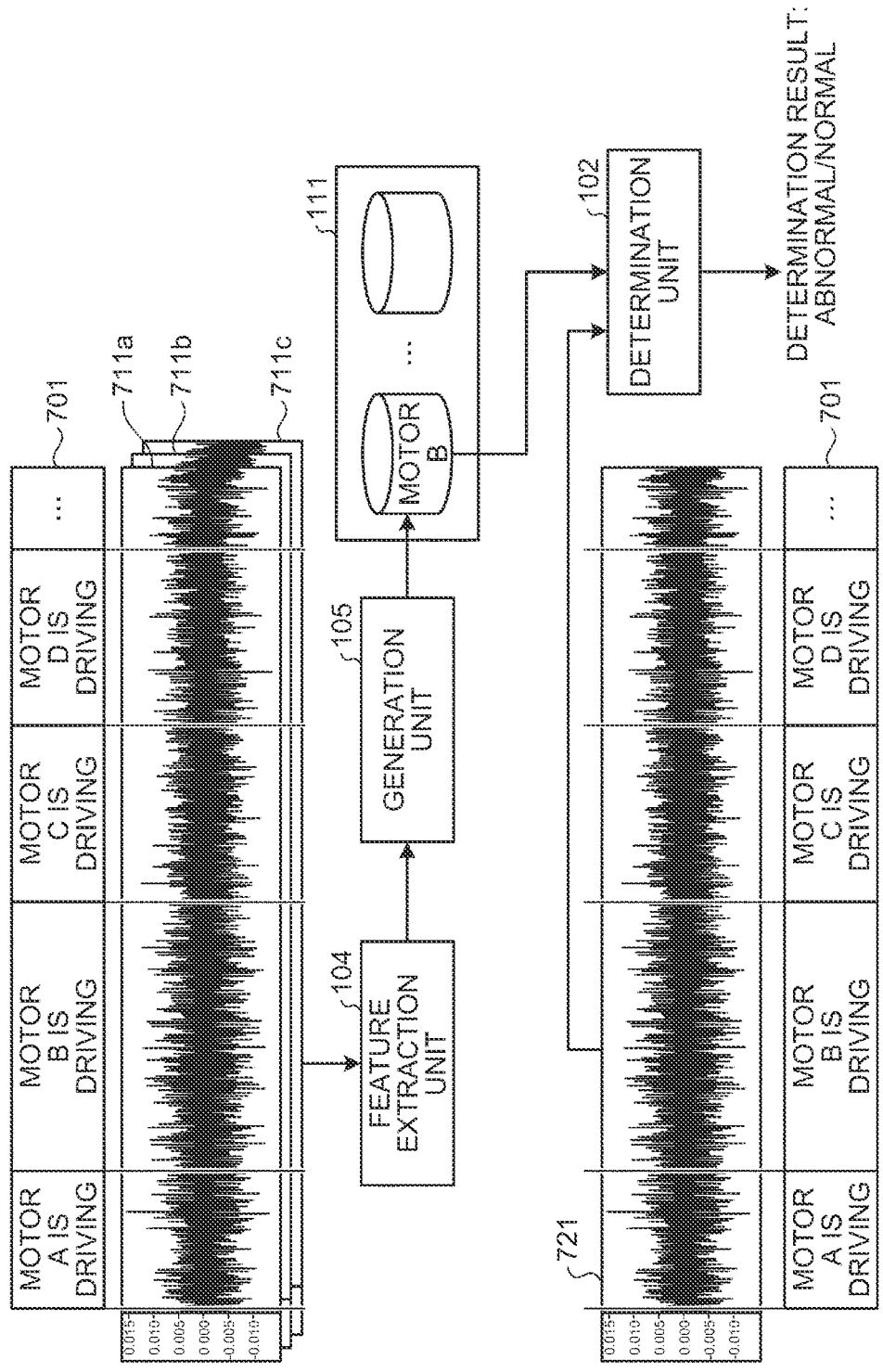
[Fig. 8]

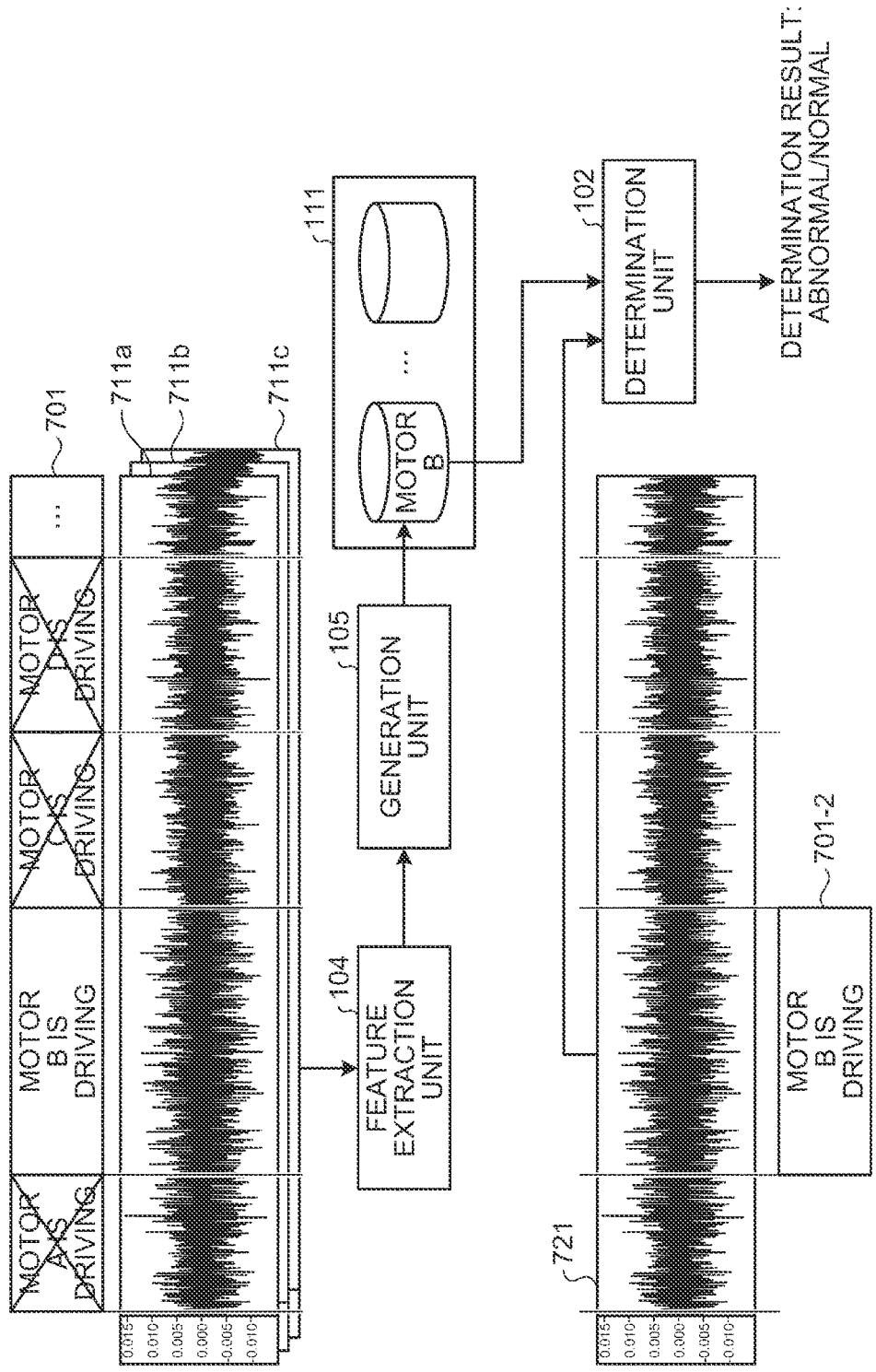

[Fig. 10]
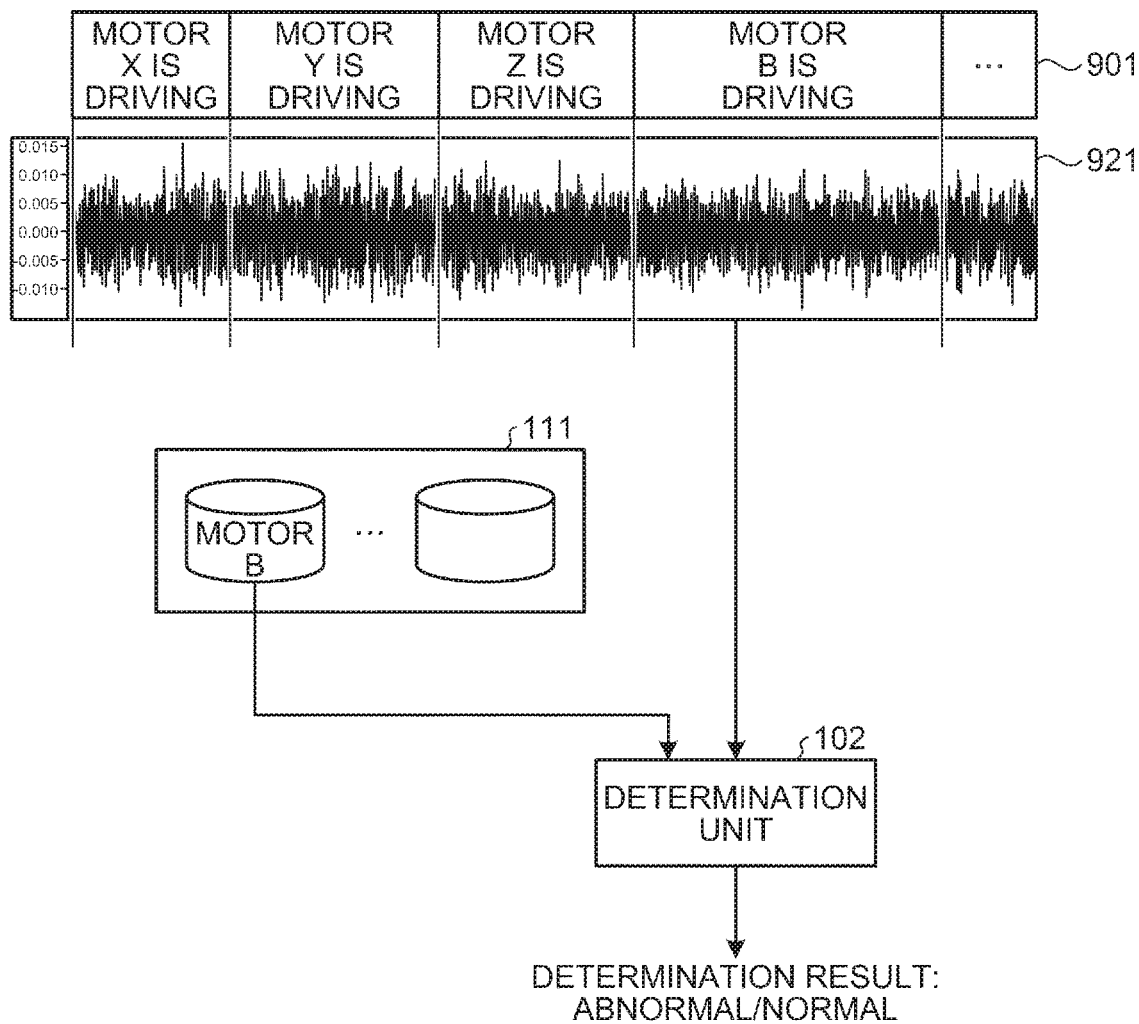

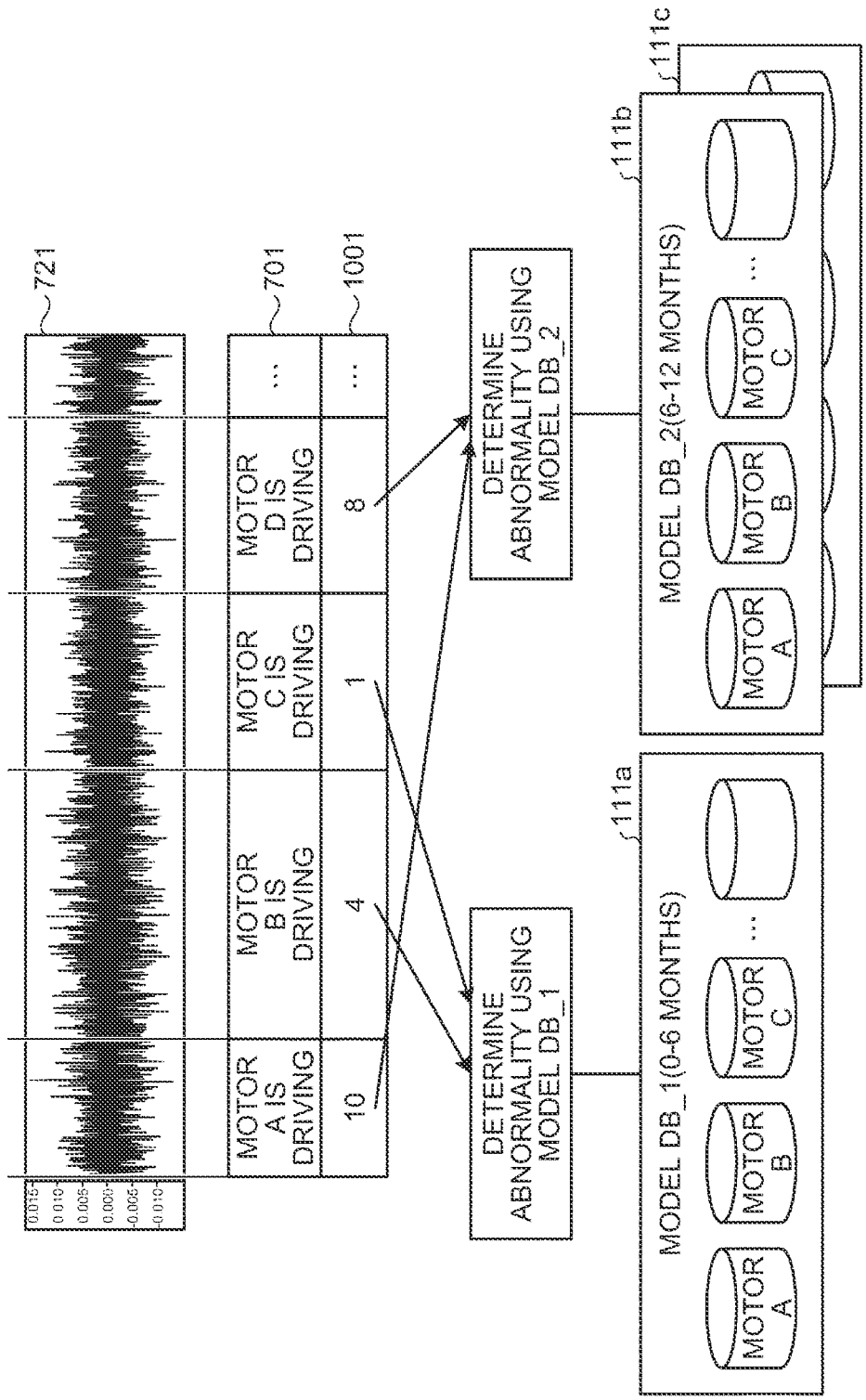

[Fig. 12]
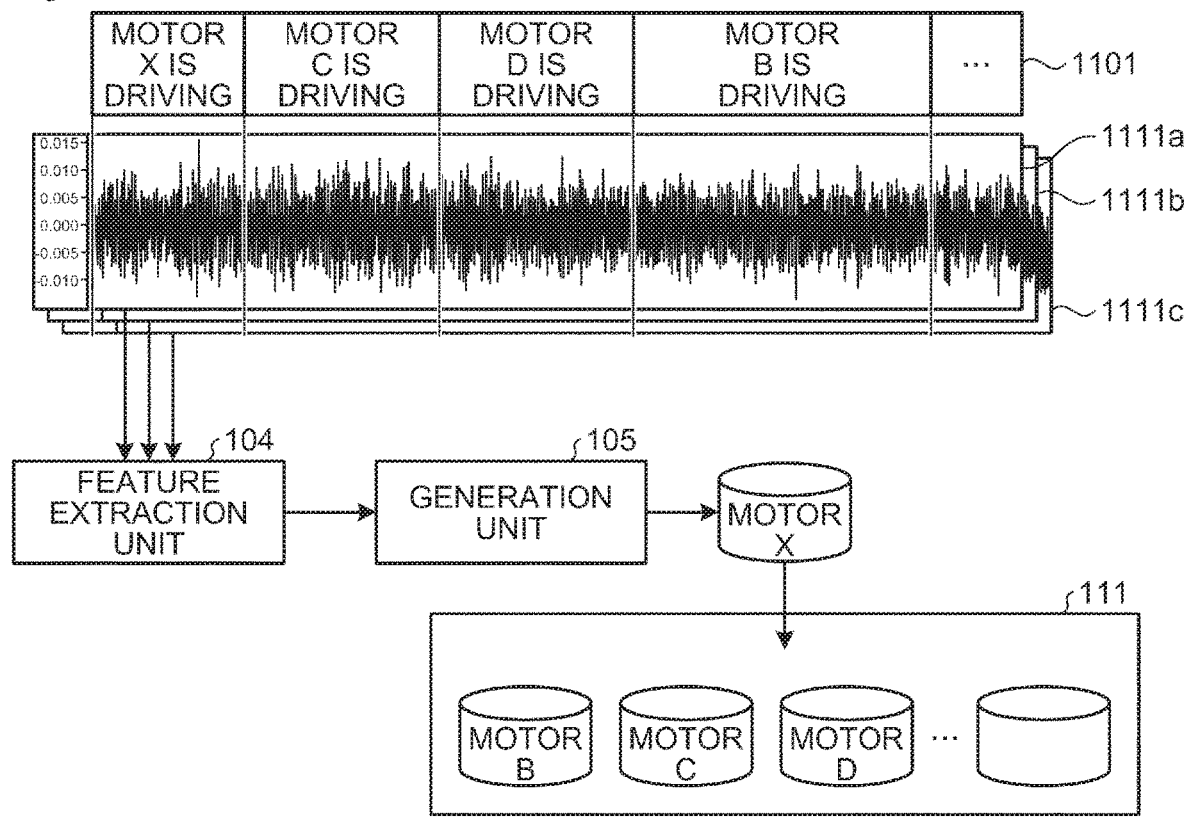
[Fig. 13]
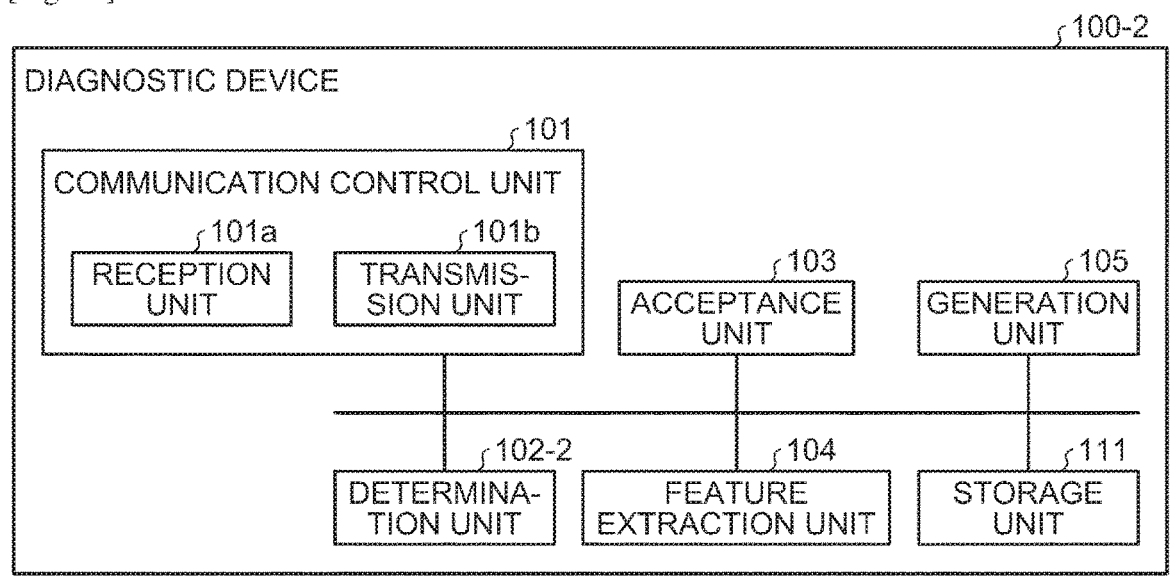

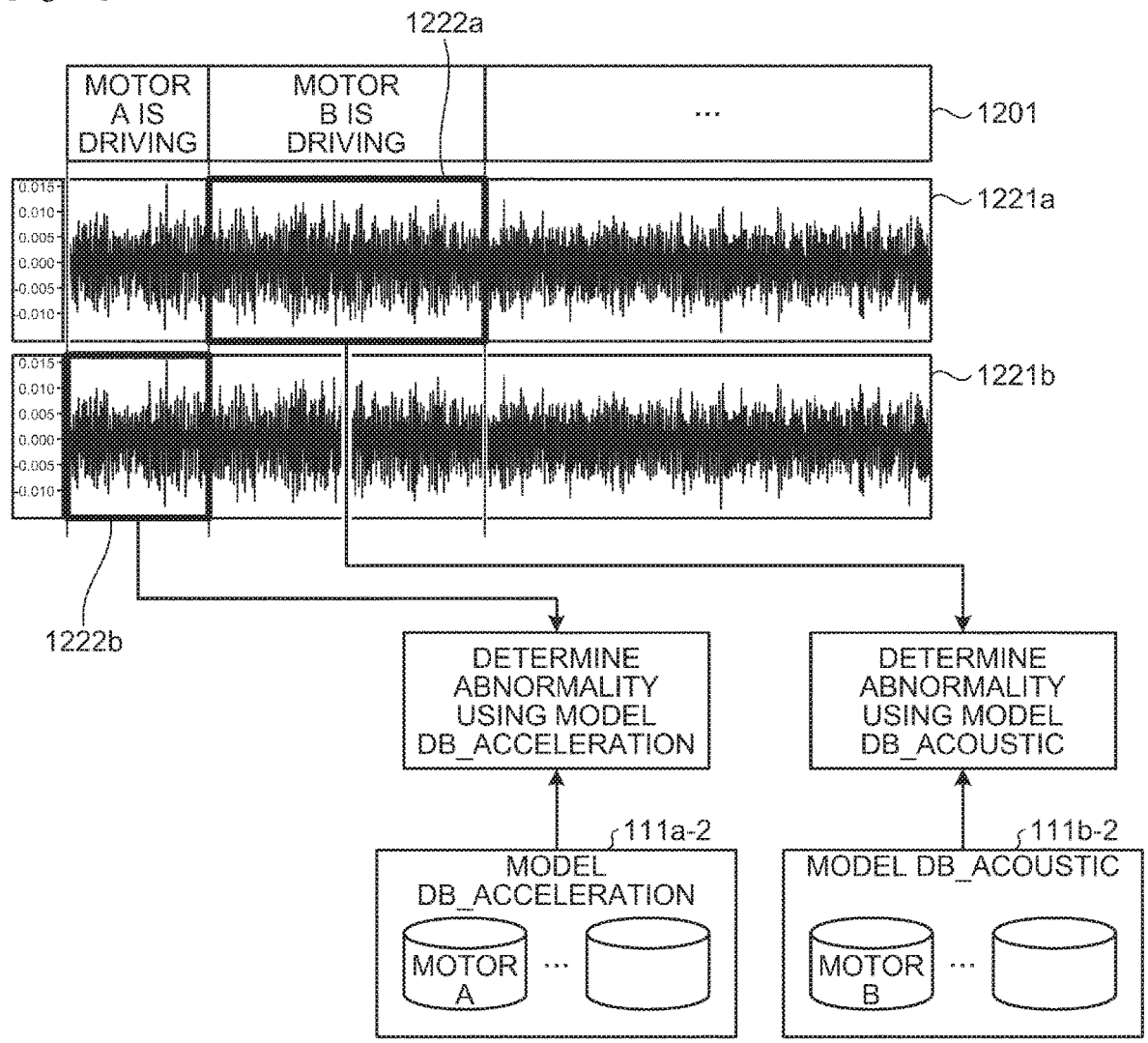

[Fig. 16]
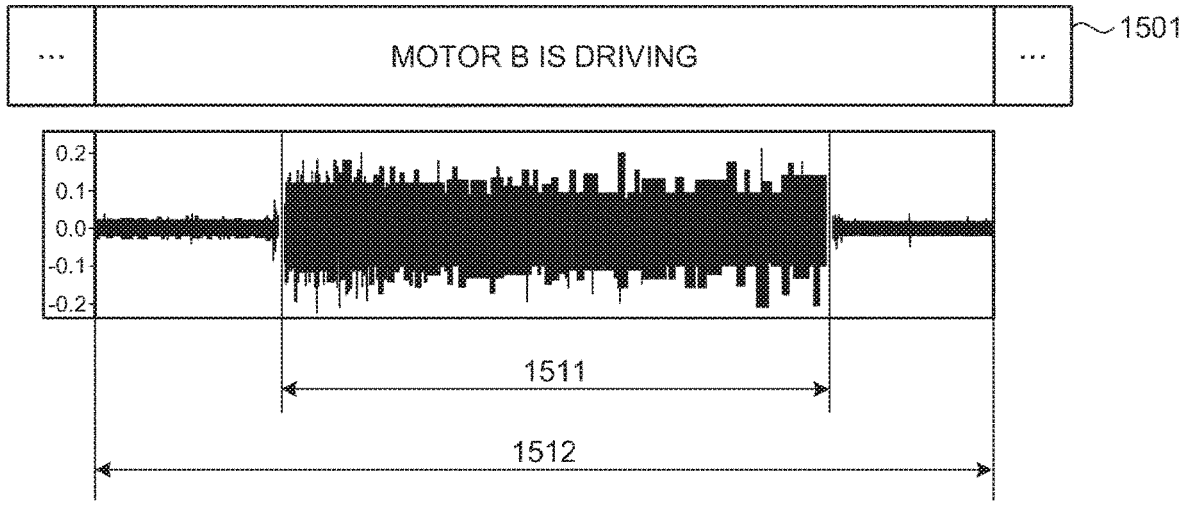
[Fig. 17]
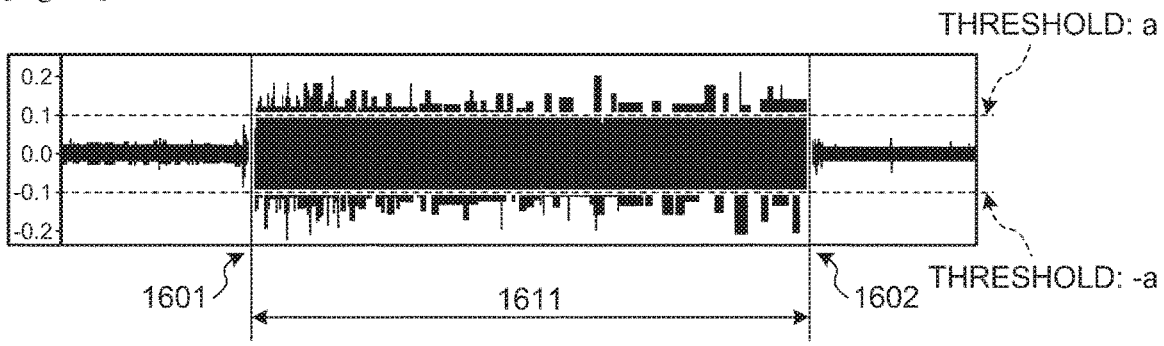
[Fig. 18]
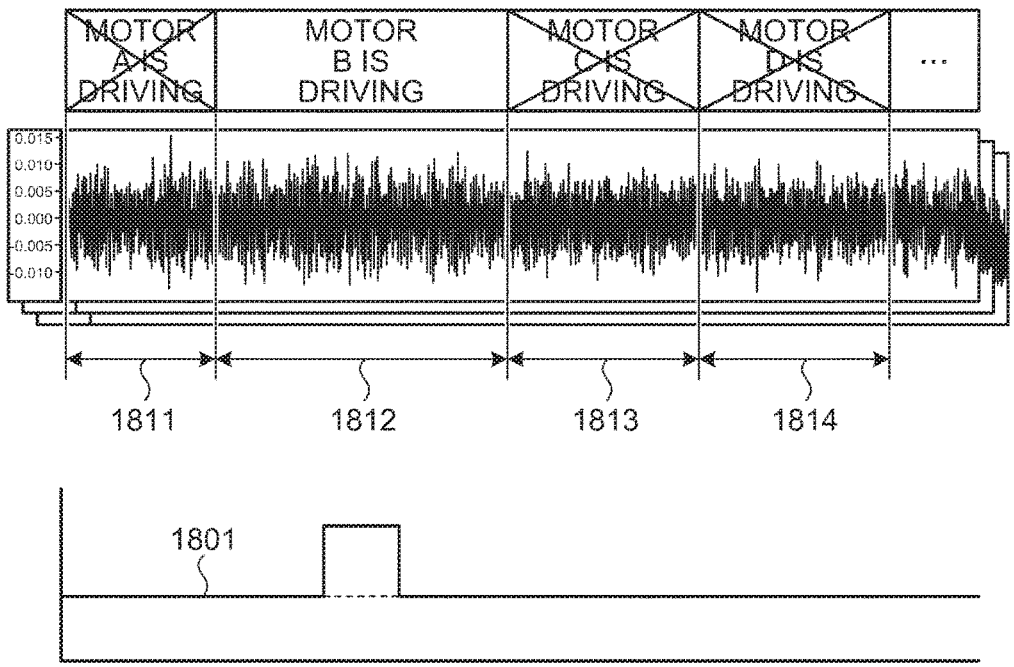

[Fig. 19]
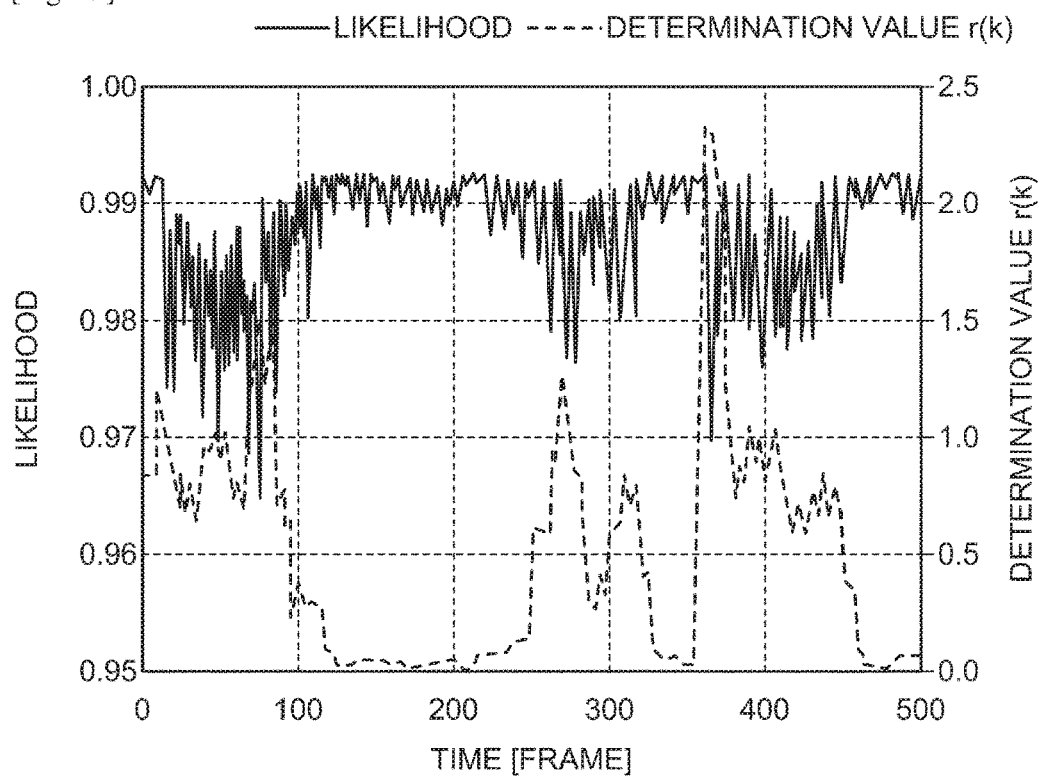
[Fig. 20]
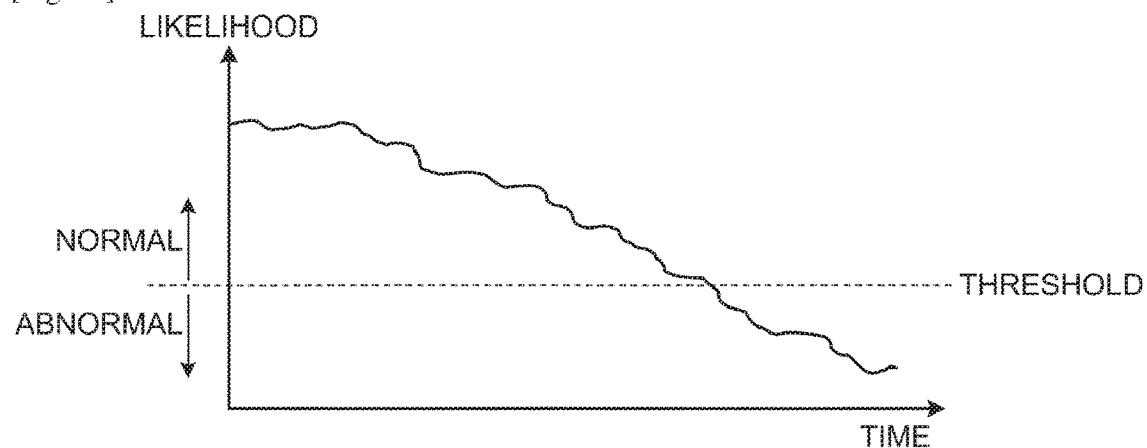
[Fig. 21]
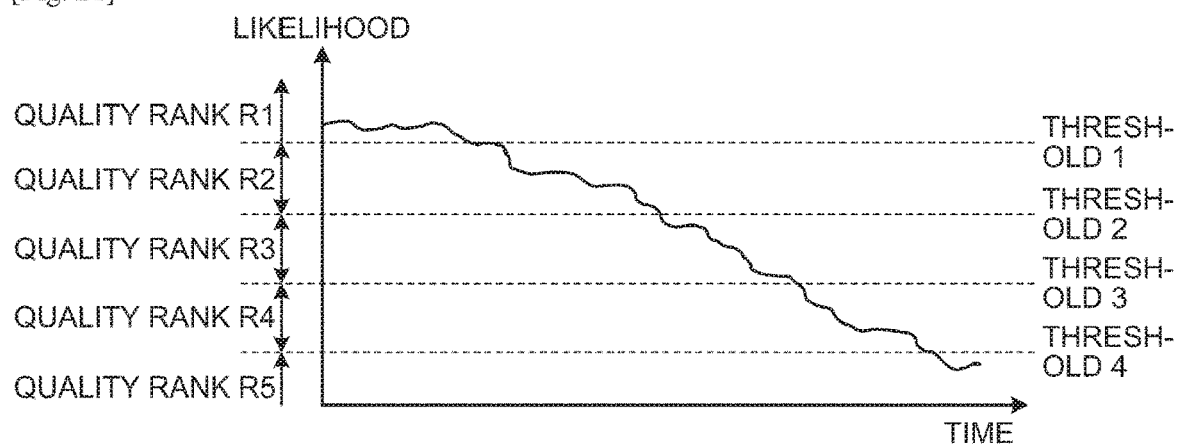

[Fig. 22]
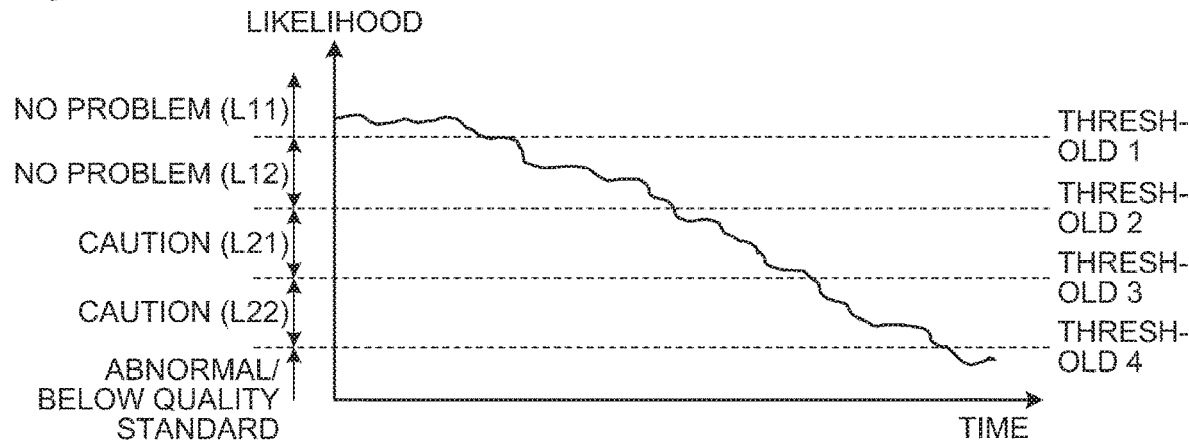
[Fig. 23-1]
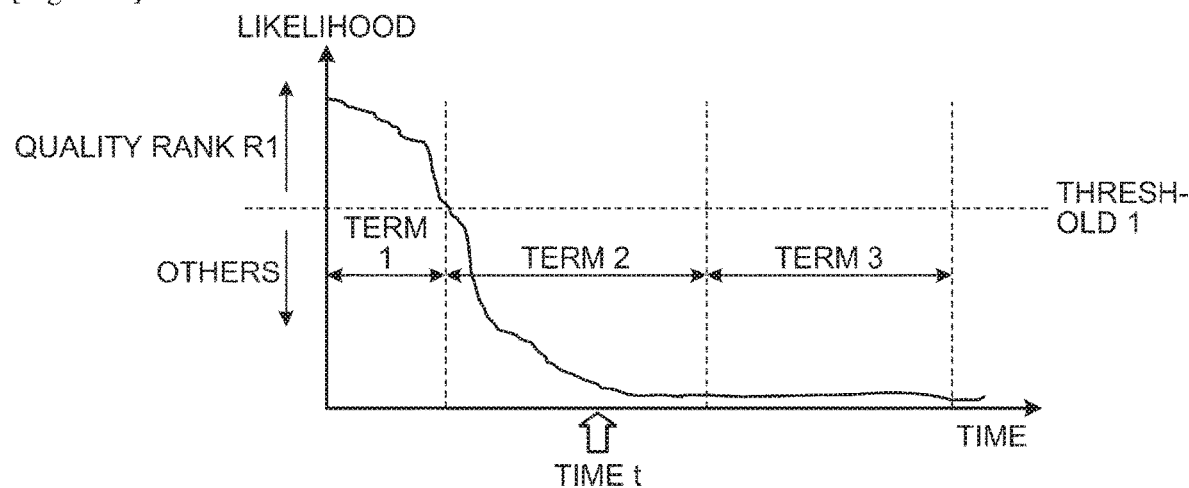
[Fig. 23-2]
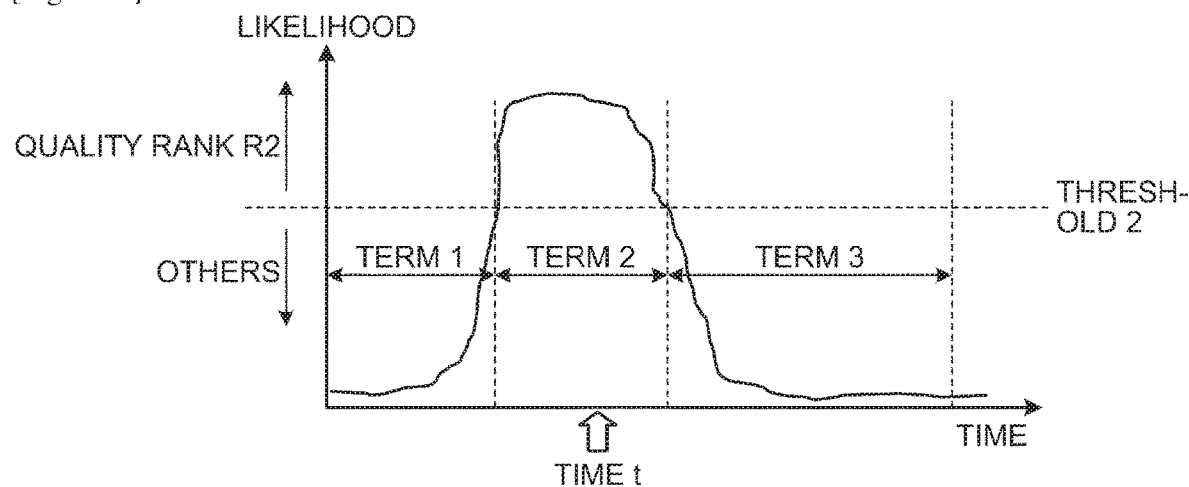

[Fig. 23-3]
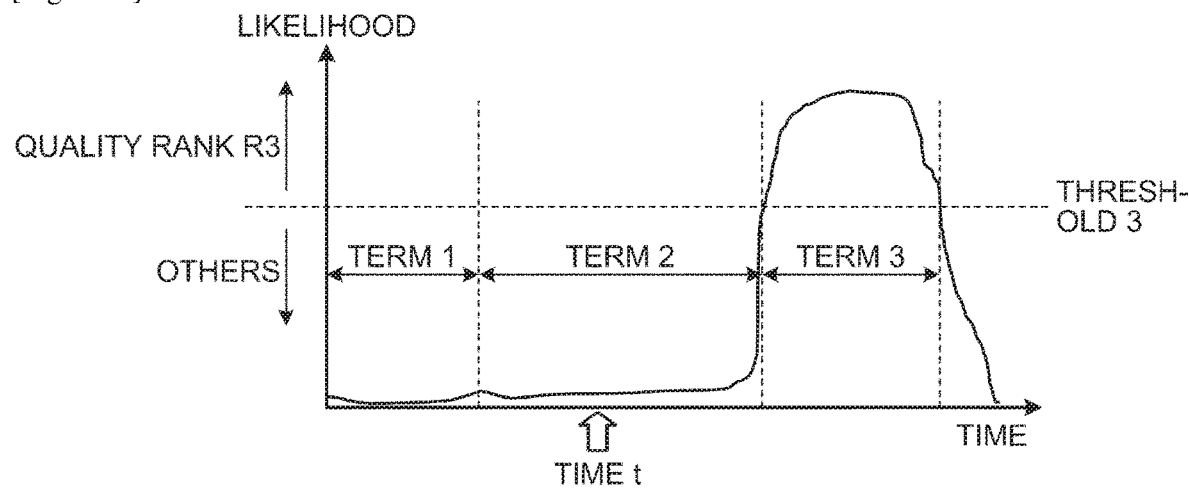
[Fig. 24-1]
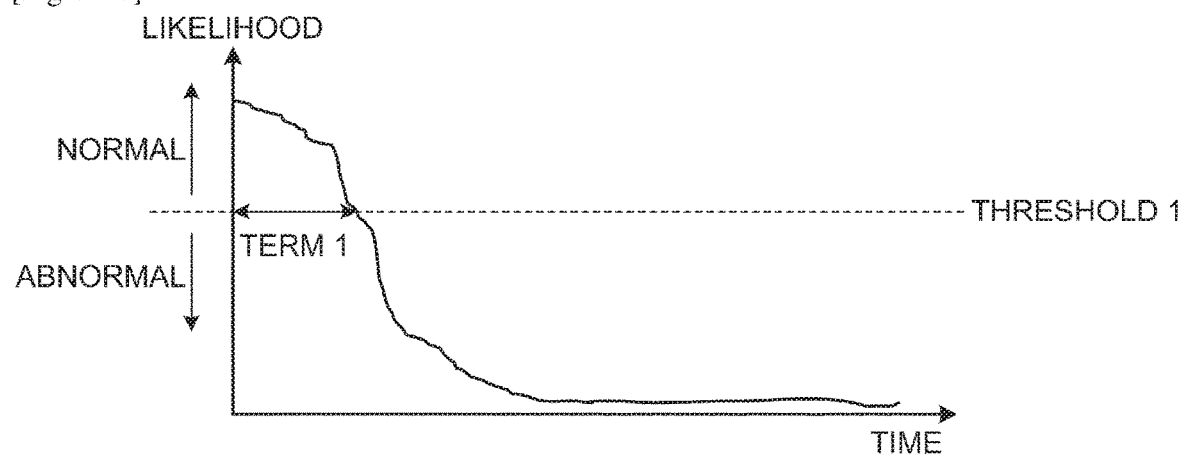
[Fig. 24-2]
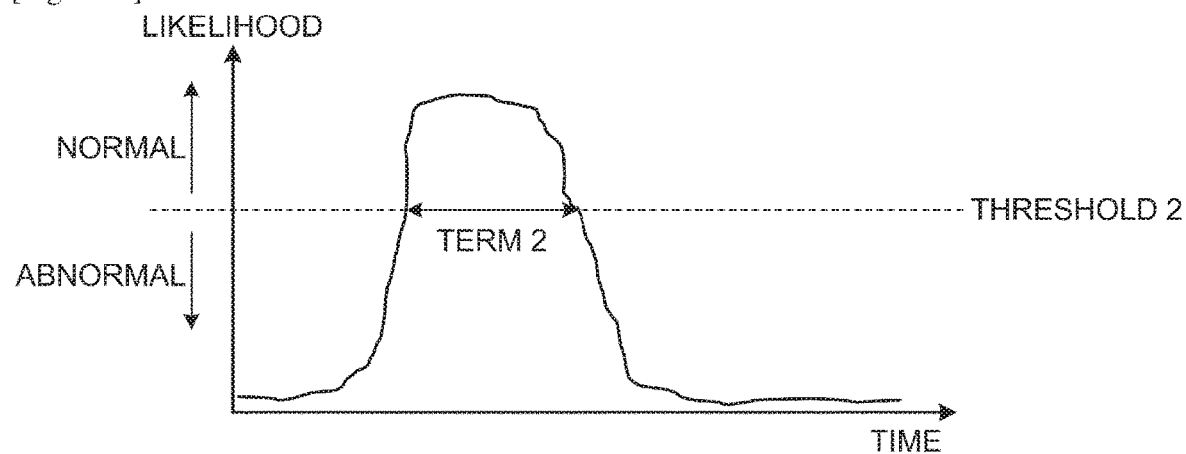

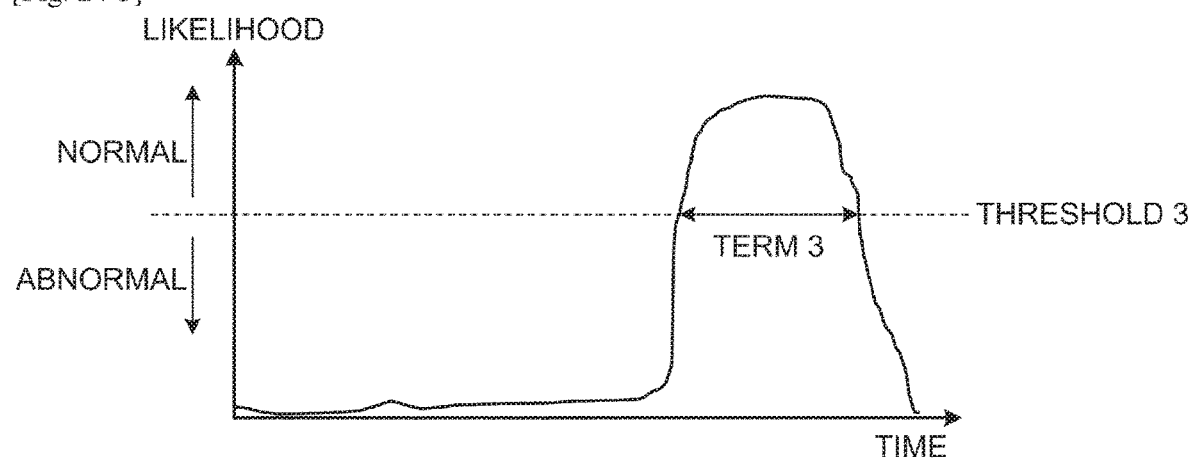
[Fig. 24-3]

DIAGNOSTIC DEVICE, COMPUTER PROGRAM, AND DIAGNOSTIC SYSTEM

TECHNICAL FIELD

The present invention relates to a diagnostic device, a computer program, and a diagnostic system.

BACKGROUND ART

There is known techniques for detecting abnormalities in image forming apparatuses by collecting operation sound data by a sound collecting unit and comparing the operation sound data with operation sound data prepared in advance for each operating state based on context information.

For example, PTL 1 discloses an image forming apparatus having a function of detecting an abnormal sound and specifying which unit generates the abnormal sound. The image forming apparatus compares operating sound data of each unit (e.g., drum motor, paper-feeding motor, fixing motor, and developing clutch) that has been collected and stored in advance with operation sound data collected during the operation of the image forming apparatus. When the difference between these sound data is larger than a certain level, the image forming apparatus determines the operation sound to be an abnormal sound. The image forming apparatus also specifies which unit is generating the abnormal sound based on an operation sequence table prepared for each unit.

SUMMARY OF INVENTION

Technical Problem

The technique disclosed in PTL 1 does not always reach a correct diagnosis in detecting abnormalities. In PTL 1, for example, the generation source of an abnormal sound is estimated based on an operation timing chart (see FIG. 20 in PTL 1, for example). This operation timing chart includes operation information on each unit, but such operation information is insufficient for estimating the exact generation source. Thus, the image forming apparatus cannot always correctly estimate the sound generation source.

The present invention has been made in view of the foregoing, and it is an object of the present invention to provide a diagnostic device, a computer program, and a diagnostic system that can increase accuracy in diagnosing the operating state such as an abnormality.

Solution to Problem

According to one aspect of the present invention, a diagnostic device includes a reception unit and a determination unit. The reception unit is configured to receive context information and sensing information. The context information corresponds to a certain operation of a target item that constitutes a target device. The context information is a piece of a plurality of pieces of context information each describing an operation of the target item determined depending on a type of operation of the target device. The sensing information is on a physical quantity that varies in accordance with the operation of the target item. The determination unit is configured to determine a state of the target item based on the sensing information detected while the target item is performing the certain operation, and based on a model corresponding to the received context information.

The model is a model of one or more models respectively defined for one or more pieces of the context information.

Advantageous Effects of Invention

According to the present invention, accuracy in diagnosing an abnormality can be increased.

BRIEF DESCRIPTION OF DRAWINGS

FIG. 1 is a block diagram illustrating an example of a configuration of a diagnostic system according to a first embodiment.

FIG. 2 is a block diagram illustrating an example of a hardware configuration of a process machine according to the first embodiment.

FIG. 3 is a block diagram illustrating an example of a hardware configuration of a diagnostic device according to the first embodiment.

FIG. 4 is a block diagram illustrating an example of a functional configuration of the diagnostic device according to the first embodiment.

FIG. 5 is a diagram illustrating an example of context information in association with models.

FIG. 6 is a flowchart illustrating an example of diagnostic process according to the first embodiment.

FIG. 7 is a flowchart illustrating an example of model generation process according to the first embodiment.

FIG. 8 is a diagram illustrating a specific example of generation process and diagnostic process according to the first embodiment.

FIG. 9 is a diagram illustrating an example of determination performed on a part of the context information.

FIG. 10 is a diagram illustrating an example of using the same model in another machining process.

FIG. 11 is a diagram illustrating an example of using cumulative operating time as the context information.

FIG. 12 is a diagram illustrating an example of generation of a model.

FIG. 13 is a block diagram illustrating an example of a functional configuration of a diagnostic device according to a second embodiment.

FIG. 14 is a diagram illustrating a specific example of processes according to the second embodiment.

FIG. 15 is a diagram illustrating an example of a data structure of corresponding information used for determining sensing information.

FIG. 16 is a diagram illustrating an example of a relation between the context information and a machining period.

FIG. 17 is a diagram illustrating an example of a method for specifying the machining period.

FIG. 18 is a diagram illustrating another example of the method for specifying the machining period.

FIG. 19 is a graph illustrating an example of a relation between likelihood and a determination value r(k).

FIG. 20 is a diagram illustrating an example of a change in likelihood over time.

FIG. 21 is a diagram illustrating an example of using a plurality of thresholds.

FIG. 22 is a diagram illustrating an example of using a plurality of thresholds.

FIG. 23-1 is a diagram illustrating an example of a determination method according to a sixth modification.

FIG. 23-2 is a diagram illustrating another example of the determination method according to the sixth modification.

FIG. 23-3 is a diagram illustrating still another example of the determination method according to the sixth modification.

FIG. 24-1 is a diagram illustrating an example of a determination method according to a seventh modification.

FIG. 24-2 is a diagram illustrating another example of the determination method according to the seventh modification.

FIG. 24-3 is a diagram illustrating still another example of the determination method according to the seventh modification.

DESCRIPTION OF EMBODIMENTS

Exemplary embodiments of a diagnostic device, a computer program, and a diagnostic system according to the present invention are described in detail below with reference to the accompanying drawings.

First Embodiment

FIG. 1 is a block diagram illustrating an example of a configuration of a diagnostic system according to a first embodiment. As illustrating in FIG. 1, this diagnostic system includes a process machine 200 and a diagnostic device 100. The process machine 200 is an example of a target device of diagnosis performed by the diagnostic device 100.

The process machine 200 and the diagnostic device 100 may be connected with each other in any form. For example, the process machine 200 and the diagnostic device 100 may be connected with each other via a dedicated connection line, a wired network such as a wired local area network (LAN), or a wireless network.

The process machine 200 includes a numerical control unit 201, a communication control unit 202, and a machine tool 203. The machine tool 203 includes a sensor 211, a drive unit 212, and a tool 213.

The machine tool 203 is a machine that processes a processing target under the control of the numerical control unit 201. The machine tool 203 includes the drive unit 212 that operates under the control of the numerical control unit 201. The drive unit 212 is, for example, a motor. The tool 213 is a target item that is actually driven by the drive unit 212. The tool 213 may be any type of tool that can be used for machining and can be controlled by numerical control, such as a drill or an end mill that processes a target workpiece. The machine tool 203 may include one or more drive units 212.

The numerical control unit 201 controls the machine tool 203 to process a workpiece by numerical control. The numerical control unit 201, for example, generates and outputs numerical control data for controlling the operation of the drive unit 212. The numerical control unit 201 outputs context information to the communication control unit 202. The context information is information defined for each type of operation of the process machine 200. The context information defined for each type of operation includes a plurality of pieces of context information. The context information includes, for example, information for identifying the tool 213 driven by the drive unit 212, the number of rotations of the drive unit 212, the rotating speed of the drive unit 212, and moving information on the drive unit 212 and the tool 213.

The numerical control unit 201 transmits the context information indicating, for example, the current operation to the diagnostic device 100 via the communication control unit 202. Depending on the procedure of a machining process in which a processing target is processed, the numerical control unit 201 changes the types of the tool 213 driven by the drive unit 2 and the drive state of the drive unit 212 (e.g., the number of rotations and rotation speed). Every time the numerical control unit 201 changes the types of operation, the numerical control unit 201 transmits the context information corresponding to the type of the operation after the change to the diagnostic device 100 via the communication control unit 202.

The communication control unit 202 controls the communication between the process machine 200 and an external device such as the diagnostic device 100. For example, the communication control unit 202 transmits the context information corresponding to the current operation to the diagnostic device 100.

The sensor 211 is a sensing unit that detects a physical quantity that varies in accordance with the operation of the process machine 200 and outputs sensing information (sensor data). The sensor 211 may be any type of sensors, and may detect any type of physical quantity. For example, the sensor 211 may be a microphone that outputs acoustic data, an acceleration sensor that outputs acceleration data, or an acoustic emission (AE) sensor that outputs AE wave data, as the sensing information. Any number of sensors 211 may be included in the machine tool 203. The machine tool 203 may include a plurality of sensors 211 that detect the same physical quantity, or may include a plurality of sensors 211 that detect different types of physical quantities.

If, for example, an edge of the tool 213 breaks or chips during use, the sound that the tool 213 is making in the machining process changes. In this case, the sensor 211 (microphone) detects acoustic data and the detected data is compared with, for example, a model representing a normal sound. Thus, such an abnormality in the operation of the process machine 200 can be detected.

The diagnostic device 100 includes a communication control unit 101 and a determination unit 102. The communication control unit 101 controls the communication between the diagnostic device 100 and an external device such as the process machine 200. The communication control unit 101, for example, receives the context information and the sensing information from the process machine 200. The determination unit 102 refers to the context information and the sensing information to determine whether the operation of the process machine 200 is normal. Details of each unit will be described later.

FIG. 2 is a block diagram illustrating an example of a hardware configuration of the process machine 200. As illustrated in FIG. 2, the process machine 200 includes a central processing unit (CPU) 51, a read only memory (ROM) 52, a random access memory (RAM) 53, a communication I/F 54, a drive control circuit 55, and a motor 56 that are connected with each other via a bus 58.

The CPU 51 controls the entire operation of the process machine 200. The CPU 51 loads a computer program stored in the ROM 52 or other storage units onto, for example, the RAM 53 as a work area and executes the computer program to control the entire operation of the process machine 200, thereby implementing its machining function.

The communication I/F 54 is an interface for communicating with an external device such as the diagnostic device 100. The drive control circuit 55 is a circuit for controlling the motor 56 to drive. The motor 56 drives the tool 213 such as a drill, a cutter, and a table that are used in a machining process. The motor 56 corresponds to, for example, the drive unit 212 in FIG. 1. A sensor 57 is installed in the process machine 200. The sensor 57 detects a physical quantity that varies depending on the operation of the process machine 200 and outputs the sensing information to the diagnostic device 100. The sensor 57 corresponds to, for example, the sensor 211 in FIG. 1.

The numerical control unit 201 and the communication control unit 202 in FIG. 1 may be implemented by causing the CPU 51 in FIG. 2 to execute a computer program, that is, implemented by software, or may be implemented by hardware such as an integrated circuit (IC), or may be implemented by both software and hardware.

FIG. 3 is a block diagram illustrating an example of a hardware configuration of the diagnostic device 100. As illustrated in FIG. 3, the diagnostic device 100 includes a CPU 61, a ROM 62, a RAM 63, a communication I/F 64, and a hard disk drive (HDD) 65 that are connected with each other via a bus 66.

The CPU 61 controls the entire operation of the diagnostic device 100. The CPU 61 loads a computer program stored in the ROM 62 or other storage units onto, for example, the RAM 63 as a work area and executes the computer program to control the entire operation of the diagnostic device 100, thereby implementing its diagnostic function. The communication I/F 64 is an interface for communicating with an external device such as the process machine 200. The HDD 65 stores therein information such as setting information of the diagnostic device 100, the context information transmitted from the numerical control unit 201 via the communication control unit 202 of the process machine 200, and the sensing information transmitted from the sensor 211. The diagnostic device 100 may include a non-volatile storage unit such as an electrically erasable programmable ROM (EEPROM) or a solid state drive (SSD) instead of or in addition to the HDD 65.

FIG. 4 is a block diagram illustrating an example of a functional configuration of the diagnostic device 100. As illustrated in FIG. 4, the diagnostic device 100 includes a acceptance unit 103, a feature extraction unit 104, a generation unit 105, and a storage unit 111 in addition to the communication control unit 101 and the determination unit 102 described above.

The storage unit 111 stores therein various types of information that are needed for the diagnostic function of the diagnostic device 100. The storage unit 111 can be implemented by, for example, the RAM 63 and the HDD 65 in FIG. 3. The storage unit 111 stores therein, for example, one or more models to be used for the determination of abnormalities.

Such models are generated by learning based on, for example, the sensing information that has been detected during a normal operation of the process machine 200. Alternatively, depending on a purpose of detection, a model is generated such that a new tool 213 is attached to the process machine 200 and is used in a certain machining process until the tool 213 is in an abnormal state (until the edge of the tool 213 breaks or chips, for example) and data for the model is acquired. Learning method may be any method, and model format may be any format. For example, models such as a Gaussian mixture model (GMM) and a hidden Markov model (HMM) can be used, and their corresponding model learning methods can be applied.

Alternatively, for example, a certain machining term after a new tool 213 is attached may be used as a learning term, in which a normal state and an abnormal state of the tool 213 may be regularized, and the regularized criteria may be stored in the storage unit 111 as models. For example, the learning term may be determined in the following manner. A new tool 213 is attached and the first ten times of machining processes are determined to be a learning term for regularizing the diagnostic criteria. Diagnostic criteria may be regularized in another device before the actual machining process, and the predetermined criteria may be stored in the storage unit 111 as models.

In the first embodiment, a model is generated for each type of context information. The storage unit 111 stores therein, for example, context information and a model corresponding to the context information in association with each other. FIG. 5 is a diagram illustrating an example of context information in association with models. As illustrated in FIG. 5, a model is generated for, for example, each type of the tool 213 to be attached to the process machine 200. When the tool 213 is a drill, a model is generated for each diameter of the drill. When three diameters of 1 mm, 3 mm, and 5 mm are available, models are generated for the respective diameters. When the determination unit 102 recognizes the diameter of the drill to be used for a machining process based on the context data received from the process machine 200, the determination unit 102 selects a learned model corresponding to the diameter of the drill and uses the model for determination.

The communication control unit 101 includes a reception unit 101a and a transmission unit 101b. The reception unit 101a receives various types of information transmitted from an external device such as the process machine 200. For example, the reception unit 101a receives context information corresponding to the current operation of the process machine 200 and sensing information transmitted from the sensor 211. The transmission unit 101b transmits various types of information to the external device.

The feature extraction unit 104 extracts, from the sensing information, feature information (feature) to be used for model generation process and for the determination performed by the determination unit 102. The feature information may be any type of information that represents a feature of the sensing information. When, for example, the sensing information is acoustic data collected by a microphone, the feature extraction unit 104 may extract features such as energy, frequency spectrum, and mel-frequency cepstrum coefficients (MFCC).

The generation unit 105 generates models for determining a normal operation by learning based on the feature information extracted from the sensing information detected during a normal operation. When the models are generated in an external device, the diagnostic device 100 does not need to include the generation unit 105. When context information for which no model has been defined and sensing information corresponding to the context information are input, the generation unit 105 may use feature information extracted from this sensing information and generate a model corresponding to this context information.

Although models are generated by the generation unit 105, the models may be generated in an external device and the generated models may be received via the communication I/F 64 and stored in the HDD 65 for use.

The determination unit 102 determines the state of the operation of the process machine 200 based on the sensing information received by the reception unit 101a and the model corresponding to the received context information. The state of the operation of the process machine 200 indicates, for example, whether the process machine 200 is operating in a normal state. For example, the determination unit 102 requests the feature extraction unit 104 to extract feature information from the sensing information. The determination unit 102 calculates a likelihood representing how likely the feature information extracted from the sensing information indicates normality based on a corresponding model. The determination unit 102 compares the likelihood with a threshold that has been determined in advance. When, for example, the likelihood is equal to or larger than the threshold, the determination unit 102 determines that the process machine 200 is operating in a normal state. When the likelihood is less than the threshold, the determination unit 102 determines that the process machine 200 is operating in an abnormal state. The feature varies in accordance with the state of the tool 213. Thus, the determination performed by the determination unit 102 includes determination of an index indicating, for example, how much the tool 213 is worn to determine the state of the operation of the process machine 200.

The method for determining whether the operation is in a normal state is not limited to this. The determination method may be any method that can determine whether the operation is in a normal state based on sensing information and a model. For example, the determination unit 102 may compare a value indicating a change in the likelihood with a threshold instead of directly comparing a value of the likelihood with a threshold.

The acceptance unit 103 receives an input of context information that differs from the context information received by the reception unit 101a from the process machine 200. For example, the acceptance unit 103 may be configured to acquire cumulative operating time from the process machine 200. In this case, the process machine 200 may include, for example, a function of resetting (initialization) the cumulative operating time that functions when the process machine 200 changes tools 213.

Alternatively, the acceptance unit 103 may receive the cumulative operating time not from the process machine 200. The acceptance unit 103 receives context information input from an operating unit such as a keyboard or a touch panel. The context information received by the acceptance unit 103 is not limited to the cumulative operating time. The context information may be, for example, information on specifications of the tool 213 to be used (diameter of a cutting edge, the number of edges, material of the tool 213, and presence or absence of coating on the tool 213), or information on the workpiece to be processed (material, for example). The acceptance unit 103 may receive the context information from an external device such as a server device or a personal computer. If the diagnostic device 100 has no need for receiving the context information from devices other than the process machine 200, the diagnostic device 100 does not need to include the acceptance unit 103.

The units in FIG. 4 (the communication control unit 101, the determination unit 102, the acceptance unit 103, the feature extraction unit 104, and the generation unit 105) may be implemented by causing the CPU 61 in FIG. 3 to execute a computer program, that is, implemented by software, or may be implemented by hardware such as an IC, or may be implemented by both software and hardware.

Described next is the diagnostic process performed by the diagnostic device 100 according to the first embodiment with reference to FIG. 6. FIG. 6 is a flowchart illustrating an example of the diagnostic process according to the first embodiment.

As described above, the numerical control unit 201 of the process machine 200 sequentially transmits the context information indicating the current operation to the diagnostic device 100. The reception unit 101a receives the context information transmitted from the process machine 200 (Step S101). The sensor 211 of the process machine 200 sequentially outputs sensing information during a machining process. The reception unit 101a receives the sensing information (sensor data) transmitted from the process machine 200 (Step S102).

The feature extraction unit 104 extracts feature information from the received sensing information (Step S103). The determination unit 102 determines whether the process machine 200 is operating in a normal state based on the extracted feature information and a model corresponding to the received context information (Step S104). The determination unit 102 outputs a result of the determination (Step S105). The result of the determination may be output by any method. When, for example, the diagnostic device 100 includes a display device such as a display, the determination unit 102 may display the result of the determination on this display device. The determination unit 102 may output the result of the determination to an external device such as a server device or a personal computer.

Described next is model generation process performed by the diagnostic device 100 according to the first embodiment with reference to FIG. 7. FIG. 7 is a flowchart illustrating an example of the model generation process according to the first embodiment. The model generation process is performed, for example, before the diagnostic process. As described above, the diagnostic device 100 may be configured to perform the model generation process upon receiving context information for which no model has been defined. When models are generated in an external device as described above, the diagnostic device 100 does not need to perform the model generation process.

The reception unit 101a receives context information transmitted from the process machine 200 (Step S201). The reception unit 101a receives sensing information (sensor data) transmitted from the process machine 200 (Step S202).

The received context information and sensing information are used for generating a model. A model is generated for each type of context information, and thus, sensing information needs to be associated with the corresponding context information. The reception unit 101a, for example, associates the received sensing information with context information received at the same timing and stores them in, for example, the storage unit 111. The diagnostic device 100 may temporarily store context information and sensing information in, for example, the storage unit 111, and determine whether the information comes from a normal operation. The diagnostic device 100 may generate a model based only on the information determined to be information on a normal operation. In other words, the diagnostic device 100 may generate a model based on sensing information that has been labeled as normal.

The determination (labeling) as to whether the process machine 200 is operating in a normal state can be performed at any timing after the information is stored in, for example, the storage unit 111, or in real time with the process machine 200 kept operating. Instead of performing the labeling, the diagnostic device 100 may generate a model on the assumption that the information indicates that the process machine 200 is operating in a normal state. If the information that has been assumed to indicate a normal state indicates actually an abnormal state, the diagnostic device 100 fails to perform a correct determination based on the generated model. This situation may cause the diagnostic device 100 to determine abnormalities more often, which, however, allows the diagnostic device 100 to recognize this incorrectly generated model and delete it, for example. The diagnostic device 100 may use a model generated from information indicating an abnormal state as a model for determining an abnormality of the process machine 200.

The feature extraction unit 104 extracts feature information from the collected sensing information (Step S203). The generation unit 105 generates a model corresponding to the context information based on the feature information extracted from the sensing information associated with this context information (Step S204). The generation unit 105 stores the generated model in, for example, the storage unit 111 (Step S205).

The following describes specific examples of the model generation process and the diagnostic process according to the first embodiment. FIG. 8 is a diagram illustrating a specific example of the processes according to the first embodiment.

FIG. 8 illustrates, for example, the model generation process and the diagnostic process performed on a part of a machining process for processing a certain workpiece. In the model generation process, the diagnostic device 100 uses a plurality of pieces of sensing information (sensing information 711a to 711c in FIG. 8) received together with context information 701. The number of the pieces of the sensing information is not limited to three, but may be any number.

The context information 701 indicates that this machining process includes operations to drive four motors (motor A, motor B, motor C, and motor D). The feature extraction unit 104 extracts feature information from the received sensing information. The generation unit 105 generates a model for each piece of context information corresponding to the motor based on the feature information extracted from the corresponding sensing information. The generated models are stored in, for example, the storage unit 111. FIG. 8 illustrates an example of storing, in the storage unit 111, a model (motor B) generated corresponding to the context information indicating that the motor B is driving. The stored model will be referred to in the diagnostic process to be performed later.

In the diagnostic process, the diagnostic device 100 receives the context information 701 and sensing information 721 in the same manner as in the model generation process. When the context information indicates that the motor B is driving, the determination unit 102 determines whether the process machine 200 is operating in a normal state based on the sensing information received during a term in which this context information is received and based on the model "motor B" stored in the storage unit 111.

When other context information is received, the determination unit 102 performs the determination based on the sensing information and the model corresponding to this context information in the same manner as described above. The determination unit 102 does not necessarily perform the determination on all the context information. FIG. 9 is a diagram illustrating an example of determination performed on a part of the context information.

In the example of FIG. 9, a model is generated only when the context information indicates that the motor B is driving. The diagnostic process is performed when context information 701-2 indicating that the motor B is driving is received. This configuration enables the diagnostic device 100 to perform the diagnostic process based only on the sensing information that is effective in determining an abnormality. When, for example, acoustic data is used as sensing information, the machining process may include a period, such as a silent period, on which no determination is needed. Eliminating such unnecessary period from the periods subjected to the determination can reduce incorrect determination and can reduce the calculation costs. In other words, this configuration achieves more accurate and more efficient diagnostic process.

When, for example, the process machine 200 uses the same motor in a different machining process, the diagnostic device 100 may perform the diagnostic process based on the same model corresponding to the motor. FIG. 10 is a diagram illustrating an example of using the same model in another machining process.

Context information 901 in FIG. 10 indicates that this machining process includes operations to drive four motors (motor X, motor Y, motor Z, and motor B). This machining process uses the motor B, which is common to the machining process illustrated in, for example, FIG. 8. Thus, the determination unit 102 can perform the diagnostic process based on the same model "motor B" and sensing information 921 in the machining process in FIG. 10.

FIG. 11 is a diagram illustrating an example of using cumulative operating time as context information. Context information 1001 indicates cumulative operating time of each motor. In the example of FIG. 11, a model is generated for each type of the motors in each range (e.g., 0 to 6 months and 6 to 12 months) of the cumulative operating time. For example, a storage unit 111a stores therein models for the motors having cumulative operating time of 0 to 6 months. A storage unit 111b stores therein models for the motors having cumulative operating time of 6 to 12 months. A storage unit 111c stores therein models for the motors having cumulative operating time of 12 months and more. The storage units 111a to 111c may be implemented by physically different storage media, or a physically identical storage medium. The determination unit 102 uses the context information 701 and the context information 1001 so as to specify a corresponding model, and performs the diagnostic process based on the specified model.

FIG. 12 is a diagram illustrating an example of generating a model when context information for which no model has been defined is input. Context information 1101 in FIG. 12 indicates that this machining process includes operations to drive four motors (motor X, motor C, motor D, and motor B). Suppose that no model has been generated for context information indicating that the motor X is driving.

In this case, the feature extraction unit 104 extracts feature information from sensing information detected in a term corresponding to the context information indicating that the motor X is driving. The feature information is extracted from a plurality of pieces of sensing information (in FIG. 12, sensing information 1111a, 1111b, and 1111c). The generation unit 105 generates a model "motor X" corresponding to the context information indicating that the motor X is driving based on the extracted feature information and stores the generated model in the storage unit 111. Thus, the diagnostic device 100 can determine an abnormality in a future term in which the motor X is driving.

According to the first embodiment, the diagnostic device 100 receives, from the process machine 200, context information indicating the current operation of the process machine 200, and uses a model corresponding to the received context information, and the diagnostic device 100 can determine an abnormality. This configuration enables the diagnostic device 100 to highly accurately specify the drive unit currently driving and highly accurately diagnose an abnormality.

Second Embodiment

In the first embodiment, the diagnostic device 100 determines whether the process machine 200 is operating in a normal state based on a single type of sensing information. The number of types of the sensing information used in the determination is not limited to one, and may be two or more. A diagnostic system according to a second embodiment determines an abnormality in the process machine 200 based on a plurality of types of sensing information.

The diagnostic system according to the second embodiment has the same configuration as that of the first embodiment illustrated in FIG. 1, and thus the explanation thereof is omitted. FIG. 13 is a block diagram illustrating an example of a functional configuration of a diagnostic device 100-2 according to the second embodiment. As illustrated in FIG. 13, the diagnostic device 100-2 includes the communication control unit 101, a determination unit 102-2, the acceptance unit 103, the feature extraction unit 104, the generation unit 105, and the storage unit 111.

The second embodiment differs from the first embodiment in that the determination unit 102-2 has a different function. Other units of the diagnostic device 100-2 have the same configurations and functions as those of the diagnostic device 100 according to the first embodiment as illustrated in the block diagram in FIG. 4, and thus are labeled with the same reference signs, and the explanation thereof is omitted.

The determination unit 102-2 determines whether the process machine 200 is operating in a normal state based on a plurality of types of sensing information. For example, the determination unit 102-2 changes the types of sensing information to be used for the determination depending on the context information.

FIG. 14 is a diagram illustrating a specific example of processes according to the second embodiment. In the example of FIG. 14, the diagnostic device 100-2 receives context information 1201 and a plurality of types of sensing information 1221a and 1221b. The sensing information 1221a is, for example, acoustic data. The sensing information 1221b is, for example, acceleration data.

When the context information indicates that the motor A is driving, the determination unit 102-2 performs determination based on the feature information extracted from sensing information 1222b, of the sensing information 1221b, detected in a term corresponding to this context information. When the context information indicates that the motor B is driving, the determination unit 102-2 performs determination based on the feature information extracted from sensing information 1222a, of the sensing information 1221a, detected in a term corresponding to this context information. The determination unit 102-2 reads a model corresponding to this context information from a storage unit 111a-2 or a storage unit 111b-2 and uses the model.

The sensing information corresponding to the context information may be determined based on the corresponding information stored in, for example, the storage unit 111. FIG. 15 is a diagram illustrating an example of a data structure of the corresponding information used for determining the sensing information. The corresponding information includes, for example, sensor data and context information. The determination unit 102-2 can determine the sensing information corresponding to the context information with reference to the corresponding information.

Described next are modifications that are applicable to the first and the second embodiments.

First Modification

The context information only indicates the period in which a certain drive unit 212 is driving. Thus, the diagnostic device may fail to precisely extract the actual machining period in which, for example, the tool 213 driven by the drive unit 212 is rotating in contact with a workpiece and machining it. In other words, an abnormality may be determined less accurately.

FIG. 16 is a diagram illustrating an example of a relation between context information and a machining period. Context information 1501 indicates that the motor B is driving. When the determination unit 102 only refers to the context information 1501, it specifies sensing information corresponding to a waveform period 1512 in the sensing information. However, the period in which the tool 213 is actually machining the workpiece is a waveform period 1511. When, for example, the sensing data is acoustic data, the waveform period 1511 corresponds to a period of acoustic data detected while the tool 213 is in contact with the workpiece and generating a sound.

In a first modification, the determination unit 102 is configured to specify an actual machining period based on both context information and sensing information. In other words, the determination unit 102 determines a term used for the determination from a term specified by the received context information based on the received sensing information. The determination unit 102 performs determination based on the sensing information in the determined term and a model.

For example, the determination unit 102 determines a machining period by specifying the time at which the feature of the sensing information changes. FIG. 17 is a diagram illustrating an example of a method for specifying a machining period. In the example of FIG. 17, the determination unit 102 specifies a time point 1601 at which the amplitude of the sensing information changes to exceed thresholds (e.g., "a" and "−a") that have been set in advance and specifies a time point 1602 at which the amplitude changes to fall within the thresholds. The determination unit 102 extracts a period 1611 between the time point 1601 and the time point 1602. The determination unit 102 performs determination by using the feature information extracted from the sensing information in the period 1611. Using the sensing information in a period corresponding to the actual machining period enables the determination unit 102 to perform determination more accurately.

Second Modification

In a second modification, the feature information is extracted (machining period is specified) by using a period specifying signal. The period specifying signal is generated in the diagnostic device 100 based on the context information transmitted from the process machine 200, but the signal may be generated in the process machine 200 and transmitted to the diagnostic device 100.

FIG. 18 is a diagram illustrating an example of a method for specifying a machining period in the second modification. When a period specifying signal 1801 indicates a machining period (a period in which a high-level signal is being output, for example), the determination unit 102 uses feature information extracted from sensing information detected in the corresponding period for the determination. In the example of FIG. 18, the determination unit 102 determines periods 1811, 1813, and 1814 not to be the machining periods, and determines a period, in a period 1812, corresponding to the signal 1801 that indicates a machining period (a period in which a high-level signal is being output, for example) to be the machining period.

When, for example, the tool 213 is a drill and is used for making a hole in a processing target, the diagnostic device 100 generates a period specifying signal based on the context information indicating the drill feed speed toward the processing target. When the diagnostic device 100 detects, from the context information, a cutting drill feed speed, which indicates that the drill has started drilling the processing target, the diagnostic device 100 generates a high-level period specifying signal (indicating that the tool 213 is processing the subject). When the diagnostic device 100 detects a change in the context information indicating that the cutting drill feed speed is changed to a non-cutting drill feed speed, which indicates that the drill has finished making a hole in the processing target, the diagnostic device 100 outputs a low-level period specifying signal instead of the high-level signal (indicating that the tool 213 is not processing the subject).

As another example, the diagnostic device 100 may generate the period specifying signal based on coordinates information indicating machining locations as the context information. In this method, the diagnostic device 100 may generate the period specifying signal based on the context information indicating that the drill or a processing target has moved to a machining coordinate location and the context information indicating that the drill or the processing target has moved away from the machining coordinate location. The diagnostic device 100 may use any type of context information that can specify a machining period in which the tool 213 is actually processing a processing target.

When the period specifying signal is generated in the process machine 200, the process machine 200 is installed with a computer program that allows the process machine 200 to generate a high-level period specifying signal under the same conditions as those of the diagnostic device 100.

As described above, the diagnostic device 100 generates a model based only on the sensing information detected during a term in which a high-level period specifying signal is being output, and not on the whole sensing information detected throughout the term in which the motor B is driving. The diagnostic device 100 diagnoses the state of the tool 213 based only on the sensing information detected during a period in which the tool 213 is actually processing the processing target. This configuration enables the diagnostic device 100 to determine the state of the tool 213 (whether the edge of the drill is abraded or cracked, for example) based only on the sensing information detected during a period in which the tool 213 is actually in contact with the tool 213, thereby increasing the accuracy of diagnosis.

Third Modification

The diagnostic device 100 may use a value of likelihood or a value representing a change in likelihood in determining whether the tool 213 is operating in a normal state. In a third modification, described is an example of a value representing a change in likelihood. As a value representing a change in likelihood, a variance of likelihood can be used, for example. A variance of likelihood in a period X is calculated, for example, by Equation (1) below, where $n_X$ represents the number of frames in the period X, k represents an index of the frames, $X_i$ represents the likelihood in a frame i (frame likelihood), and $\mu_X$ represents the mean of the frame likelihoods in the period X. Each frame corresponds to a unit period for which the likelihood is calculated.

$$V_X(k) = \frac{1}{n_X} \sum_{i=k-\frac{n_X-1}{2}}^{k+\frac{n_X-1}{2}} (x_i - \mu_X)^2 \quad (1)$$

A scored value may be calculated based on the variance calculated by Equation (1), for example, and may be used for the determination. For example, r(k) in Equation (2) below may be used for the determination.

$$r(k) = V_S(k)/V_L(k) \quad (2)$$

S and L each represent the type of the period X. S represents a short period, and L represents a long period. $V_S(k)$ represents a value calculated by Equation (1) for a short period. $V_L(k)$ represents a value calculated by Equation (1) for a long period. With respect to S and L, $n_S$ and $\mu_S$, and $n_L$ and $\mu_L$ corresponding to $n_X$ and $\mu_X$, respectively, are calculated.

FIG. 19 is a graph illustrating an example of a relation between the likelihood and the determination value r(k). In a determination method that compares a likelihood with a threshold, which is assumed to be, for example, 0.97, the diagnostic device 100 determines that the operation from 200 to 300 frames is performed in a normal state. In a determination method that compares a determination value r(k) with a threshold (e.g., 1.0), the diagnostic device 100 can determine that the operation from 200 to 300 frames is performed in an abnormal state.

Fourth Modification

The determination unit 102 may be configured to determine and output a change in the likelihood over time as well as compare a likelihood with a threshold in determining whether the operation is performed in a normal state. When, for example, the determination unit 102 uses a single model representing a normal operation, the determination unit 102 may store calculated likelihoods in, for example, the storage unit 111 and obtain a change in the likelihood (whether the likelihood is decreasing over time, for example).

FIG. 20 is a diagram illustrating an example of a change in the likelihood over time. The determination unit 102 can obtain a change in the likelihood over time by storing, for example, time of the determination and likelihoods. The determination unit 102 determines that the operation is performed in an abnormal state when the likelihood falls below the threshold, which is the same configuration as that in the embodiments above. The determination unit 102 may be configured to obtain and output, for example, information indicating a change in the likelihood over time and time at which the likelihood is anticipated to fall below the threshold.

Fifth Modification

The determination unit 102 may be configured to determine quality ranks or quality levels based on a plurality of thresholds. FIGS. 21 and 22 are diagrams each illustrating an example of using a plurality of thresholds. FIGS. 21 and 22 each illustrate an example of using four thresholds (thresholds 1 to 4), but the number of thresholds is not limited to four.

FIG. 21 illustrates an example of five quality ranks from R1 to R5 that are separated based on whether the likelihood is above or below the four thresholds. The determination unit 102 compares the likelihood with the thresholds, and determines and outputs the quality rank. The quality rank can be used as, for example, information (quality information) indicating quality of an object (processed item) machined by the process machine 200.

FIG. 22 illustrates an example of determining whether the quality is at a normal level (no problem), at a caution level, or at an abnormal level (below a quality standard) based on whether the likelihood is above or below the four thresholds. When the determination unit 102 determines that the quality is at a normal level, the determination unit 102 classifies the quality into further two levels, L11 and L12. When the determination unit 102 determines that the quality is at a caution level, the determination unit 102 classifies the quality into further two levels, L21 and L22. The determination unit 102 may classify the quality into three or more levels.

Sixth Modification

The determination unit 102 may calculate a plurality of likelihoods based on a plurality of models that are defined in accordance with a quality rank to determine whether the operation is performed in a normal state, and to determine the quality level when determining a normal operation. FIGS. 23-1 to 23-3 are diagrams illustrating an example of a determination method according to a sixth modification.

FIGS. 23-1, 23-2, and 23-3 correspond to the quality ranks R1, R2, and R3, respectively, and each illustrate an example of the likelihood calculated based on a model used for determining the corresponding quality rank. The quality rank R1 represents, for example, quality that is determined to be normal in an initial term 1 during a change in likelihood over time. The quality rank R2 represents, for example, quality that is determined to be normal in a middle term 2 during the change over time. The quality rank R3 represents, for example, quality that is determined to be normal in a final term 3 during the change over time.

The determination unit 102 calculates a plurality of likelihoods based on a plurality of models corresponding to such quality ranks. Typically, when the likelihood calculated based on any one of the models exceeds the threshold, the likelihood calculated based on the other models will not exceed the threshold. When the determination unit 102 calculates a likelihood based on a certain model and the likelihood exceeds the threshold, the determination unit 102 determines the quality rank of this model and outputs the quality rank as a result of determination. When the determination unit 102 calculates the likelihood based on these models and no likelihood exceeds the threshold, the determination unit 102 determines that the operation is performed in an abnormal state.

The models may be generated in advance for the respective quality ranks. According to the sixth modification, the determination unit 102 can determine whether the operation is performed in a normal state, and also determine the quality level. The determination unit 102 can also determine the term in the change in likelihood to which the current operation corresponds.

Seventh Modification

The determination unit 102 may use a plurality of models and change them in accordance with the elapsed time to perform determination. FIGS. 24-1 to 24-3 are diagrams illustrating an example of a determination method according to a seventh modification.

FIGS. 24-1, 24-2, and 24-3 correspond to a term 1, 2, and 3, respectively, and each illustrate an example of the likelihood calculated based on a model generated for the corresponding term. The terms 1, 2, and 3 correspond to the initial, middle, and final terms, respectively, in the change in likelihood over time. Each model may be generated in advance based on the sensing information detected during the corresponding term.

The determination unit 102 determines which model to take from the models for the respective terms based on, for example, context information for specifying the term such as the cumulative operating time. The determination unit 102 determines whether the operation is performed in a normal state based on the specified model. According to the seventh modification, the determination unit 102 can determine whether the current state is a reasonable change over time (normal state) or a state that deviates from the reasonable change over time (abnormal state).

Eighth Modification

The determination unit 102 may perform determination based on a model specified from a plurality of models that are defined in accordance with the quality ranks. When, for example, a higher quality machining is required for a workpiece, the determination unit 102 uses a model defined for a high quality rank. When, for example, a regular quality machining is required, the determination unit 102 uses a model defined for a lower quality rank than the high quality rank. The determination unit 102 may determine which model to take based on, for example, the context information received by the reception unit 101a and information received via the acceptance unit 103.

The computer program executed by the diagnostic device according to the embodiments above is embedded and provided in a ROM, for example.

The computer program executed by the diagnostic device according to the embodiments above may be recorded in a computer-readable recording medium such as a compact disc read only memory (CD-ROM), a flexible disk (FD), a compact disc recordable (CD-R), or a digital versatile disc (DVD), as an installable or executable file and may be provided as a computer program product.

The computer program executed by the diagnostic device according to the embodiments above may be stored in a computer connected to a network such as the Internet and provided by being downloaded via the network. Furthermore, the computer program executed by the diagnostic device according to the embodiments above may be provided or distributed via a network such as the Internet.

The computer program executed by the diagnostic device according to the embodiments above has a module configuration including the units (such as the communication control unit and the determination unit) described above. As actual hardware, the units are loaded on a main memory when the CPU (processor) reads out and executes the computer program from the ROM, and the units are generated on the main memory.

REFERENCE SIGNS LIST

51 CPU
52 ROM
53 RAM
54 Communication I/F
55 Drive control circuit
56 Motor
57 Sensor
58 Bus
61 CPU
62 ROM
63 RAM
64 Communication I/F
65 HDD
66 Bus
100 Diagnostic device
101 Communication control unit
101a Reception unit
101b Transmission unit
102 Determination unit
103 Acceptance unit
104 Feature extraction unit
105 Generation unit
111 Storage unit
200 Process machine 201 Numerical control unit
202 Communication control unit
203 Machine tool
211 Sensor
212 Drive unit

CITATION LIST

Patent Literature

PTL 1: Japanese Laid-open Patent Publication No. 2006-184722

The invention claimed is:

1. A diagnostic device comprising:
a receiver configured to receive sensing information and describing information, the sensing information being information on a physical quantity including acoustic data, acceleration data, or acoustic emission (AE) wave data, that varies in accordance with an operation by a tool, the describing information indicating a drive unit is driving; and
at least one processor,
configured to specify an actual machining period based on both of the describing information and the sensing information, the actual machining period being a period while the tool is in contact with a workpiece; and
configured to determine a state of the tool, using the specified sensing information in the actual machining period and a model.

2. The diagnostic device according to claim 1, wherein the at least one processor is configured to specify, based on the describing information, the sensing information detected while the tool is performing a certain operation, and determines the state of the tool based on the specified sensing information and a comparison of the determined state and a stored model representing at least one of an abnormal operation state of the tool or a normal operation state of the tool performing the machining operation.

3. The diagnostic device according to claim 1, wherein
the receiver is configured to receive a plurality of pieces of sensing information, and
based on, out of the received pieces of sensing information, the sensing information detected during a term which is specified by the received describing information and in which the tool is performing a certain operation, and based on a model corresponding to the received describing information, the at least one processor determines the state of the tool in the term.

4. The diagnostic device according to claim 1, wherein
the receiver is configured to receive a plurality of types of sensing information each corresponding to a different physical quantity, and
the at least one processor is configured to determine the state of the tool based on, out of the types of the sensing information, the sensing information determined in accordance with the describing information, and based on a model corresponding to the received describing information.

5. The diagnostic device according to claim 1, wherein the at least one processor is further configured to generate, when describing information for which no model has been defined is received, a model corresponding to the describing information for which no model has been defined based on the sensing information corresponding to the describing information.

6. The diagnostic device according to claim 1, further comprising an acceptor configured to receive an input of describing information that differs from the describing information received by the receiver, wherein
the at least one processor is configured to determine the state of the tool based on the received sensing information, and based on a model corresponding to at least one of the describing information received by the receiver and the describing information received by the acceptor.

7. The diagnostic device according to claim 1, wherein the at least one processor is further configured to determine, based on the received sensing information, a term for use in determining the state of the tool from a term specified by the received describing information, and determine the state of the tool based on the sensing information detected during the determined term and a model.

8. The diagnostic device according to claim 1, wherein the at least one processor is further configured to obtain a likelihood of the received sensing information relative to a model, and determines the state of the tool by comparing at least one of the likelihood and a value indicating a change in the likelihood with a threshold.

9. The diagnostic device according to claim 1, wherein
a model is generated based on sensing information on the physical quantity detected while the tool is operating in a normal state, and
the at least one processor obtains a likelihood of the received sensing information relative to the generated model and outputs quality information defined in accordance with the likelihood.

10. The diagnostic device according to claim 9, wherein the at least one processor is further configured to compare at least one of the likelihood and a value indicating a change in the likelihood with a plurality of thresholds to determine quality information from among a plurality of pieces of quality information, and outputs the determined quality information.

11. The diagnostic device according to claim 1, wherein
the at least one processor determines the state of the tool with respect to a model and outputs information indicating quality corresponding to the model with which the state of the tool is determined to be normal.

12. The diagnostic device according to claim 1, wherein the describing information indicates operating time of a drive unit included in the tool.

13. The diagnostic device according to claim 1, wherein the at least one processor is configured to determine the state of the tool based on a model corresponding to specified quality and the received describing information.

14. A non-transitory computer-readable medium containing a computer program for causing a computer to perform:
receiving describing information and sensing information, the sensing information being information on a physical quantity including acoustic data, acceleration data, or acoustic emission (AE) wave data that varies in accordance with an operation by a tool, the describing information indicating a drive unit is driving;
specifying an actual machining period based on both of the describing information and the sensing information, the actual machining period being a period while the tool is in contact with a workpiece; and
determining a state of the tool, using the specified sensing information in the actual machining period and a model.

15. A diagnostic device comprising:
a receiver configured to receive describing information and sensing information, the sensing information being information on a physical quantity including acoustic data, acceleration data, or AE wave data that varies in accordance with an operation by a tool, the describing information indicating a drive unit is driving describing a type of the tool and an operation of the tool; and at least one processor, configured to specify an actual machining period based on both of the describing information and the sensing information, the actual machining period being a period while the tool is in contact with a workpiece; and configured to determine quality information indicating a quality of a processed item, using the specified sensing information in the actual machining period and a model.

* * * * *